United States Patent [19]

Reed

[11] Patent Number: 5,676,405
[45] Date of Patent: Oct. 14, 1997

[54] QUICK DISCONNECT COUPLING

[75] Inventor: Gary A. Reed, Massillon, Ohio

[73] Assignee: The Hoover Company, North Canton, Ohio

[21] Appl. No.: 183,277

[22] Filed: Jan. 14, 1994

[51] Int. Cl.⁶ ................................................. F16L 37/12
[52] U.S. Cl. ................... 285/315; 285/322; 285/374; 285/332; 251/149.6
[58] Field of Search .................... 251/149.6; 285/322, 285/323, 314, 315, 318, 243, 244, 332, 332.2, 332.3, 374

[56] References Cited

U.S. PATENT DOCUMENTS

| | | | |
|---|---|---|---|
| 2,727,759 | 12/1955 | Elliott | 285/322 X |
| 2,727,761 | 12/1955 | Elliott et al. | 285/322 X |
| 2,784,987 | 3/1957 | Corcoran | 285/315 X |
| 3,628,812 | 12/1971 | Larralde | 285/315 X |
| 4,275,907 | 6/1981 | Hunt | 285/18 |
| 4,902,045 | 2/1990 | McGugan et al. | 285/322 X |
| 5,029,904 | 7/1991 | Hunt | 285/24 |
| 5,083,819 | 1/1992 | Bynum | 285/89 |
| 5,100,182 | 3/1992 | Norkey et al. | 285/318 |
| 5,181,751 | 1/1993 | Kitamura | 285/322 X |
| 5,310,225 | 5/1994 | Ruckwardt | 285/314 X |

*Primary Examiner*—Terry Lee Melius
*Assistant Examiner*—Heather Shackelford
*Attorney, Agent, or Firm*—Renner, Kenner, Greive, Bobak, Taylor & Weber

[57] ABSTRACT

A novel quick-disconnect coupling is disclosed comprising a tubular member and a sleeve member sealingly receiving the tubular member therein. The coupling members each attachable to a hose end provide quick connect and disconnect of the hoses to one another. The tubular member is generally conical in shape having a larger diameter at its distal end and a smaller diameter at its proximal end. The sleeve member includes a plurality of axially extending fingers which, after the members are joined, are forced radially inward against the converging conical surface of the tubular member by an encircling collar thereby securing the sleeve member to the tubular member until the collar is retracted.

4 Claims, 18 Drawing Sheets

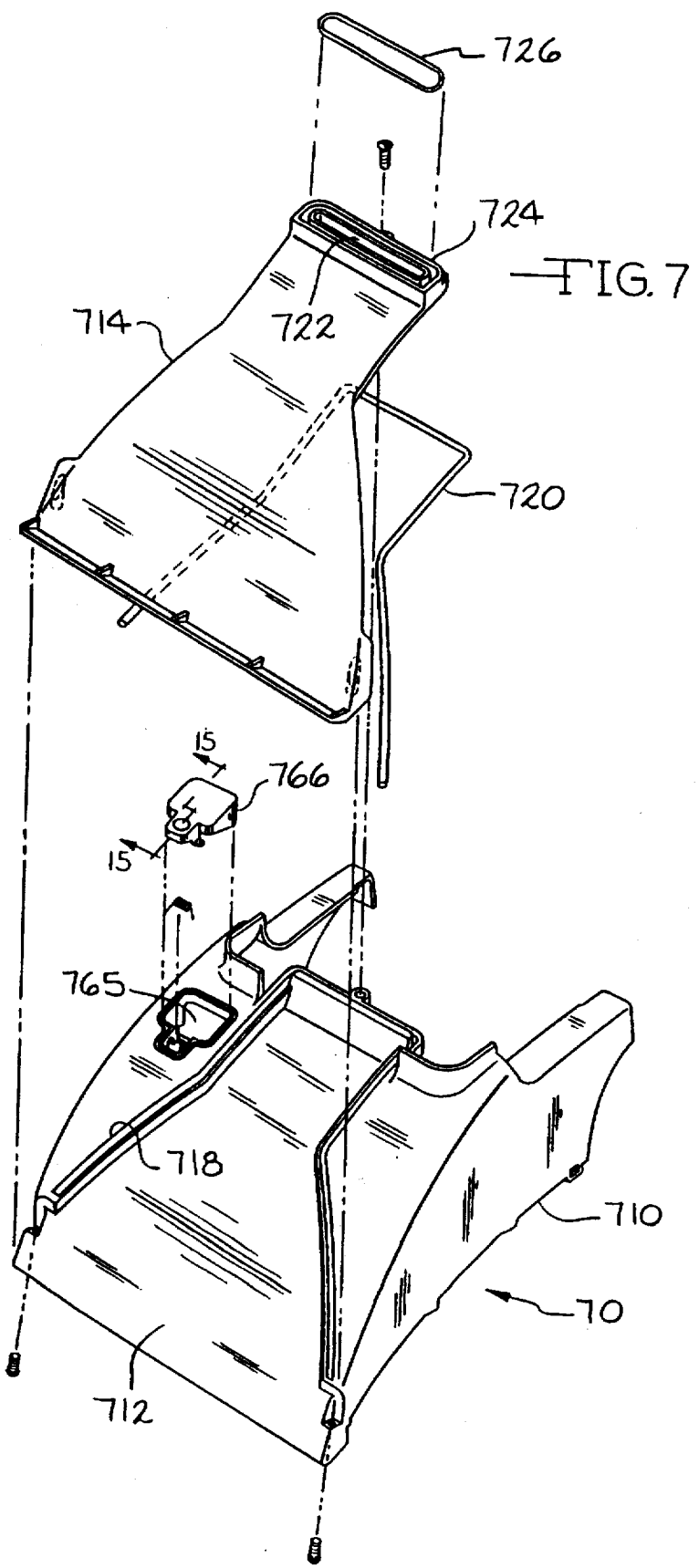

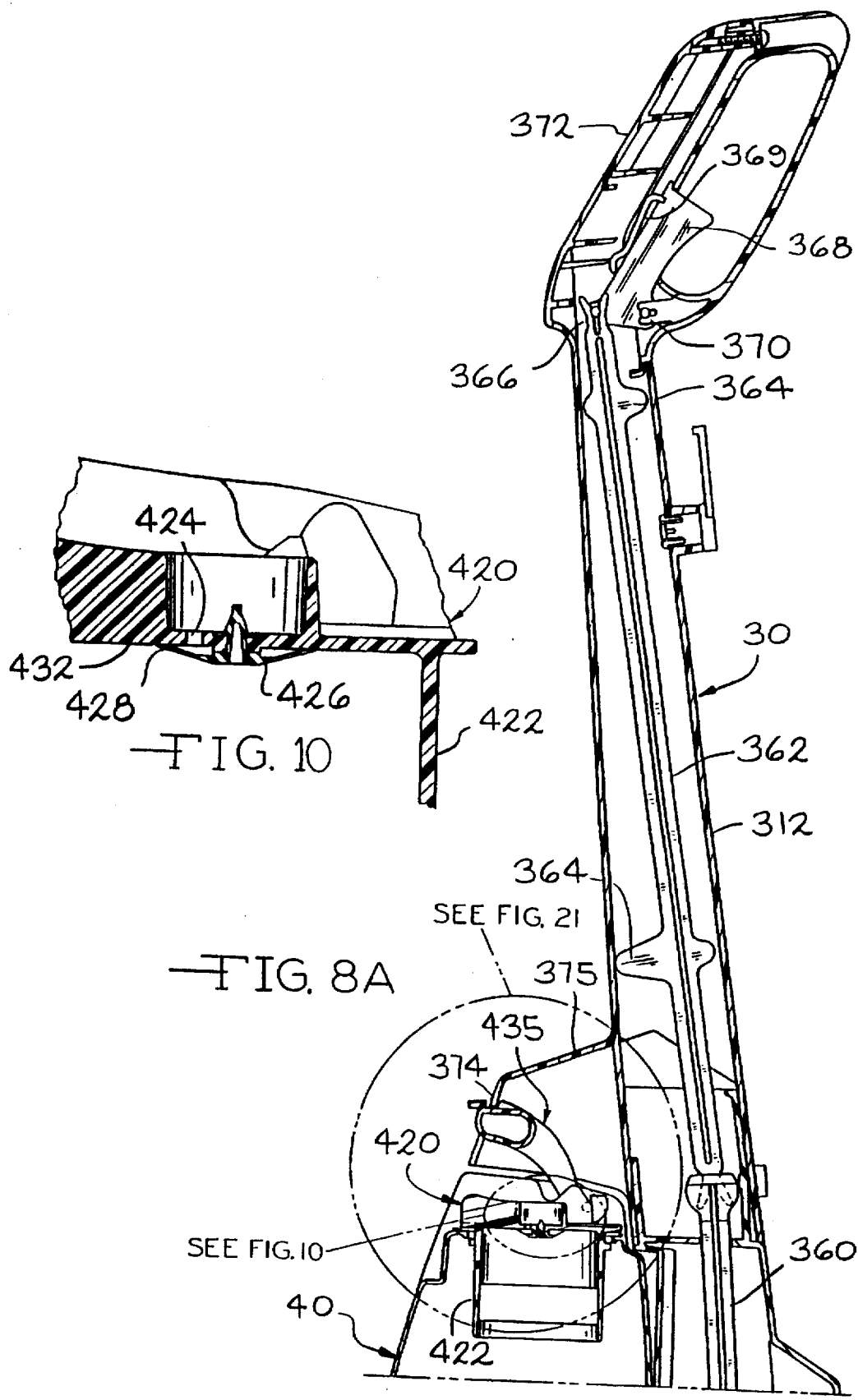

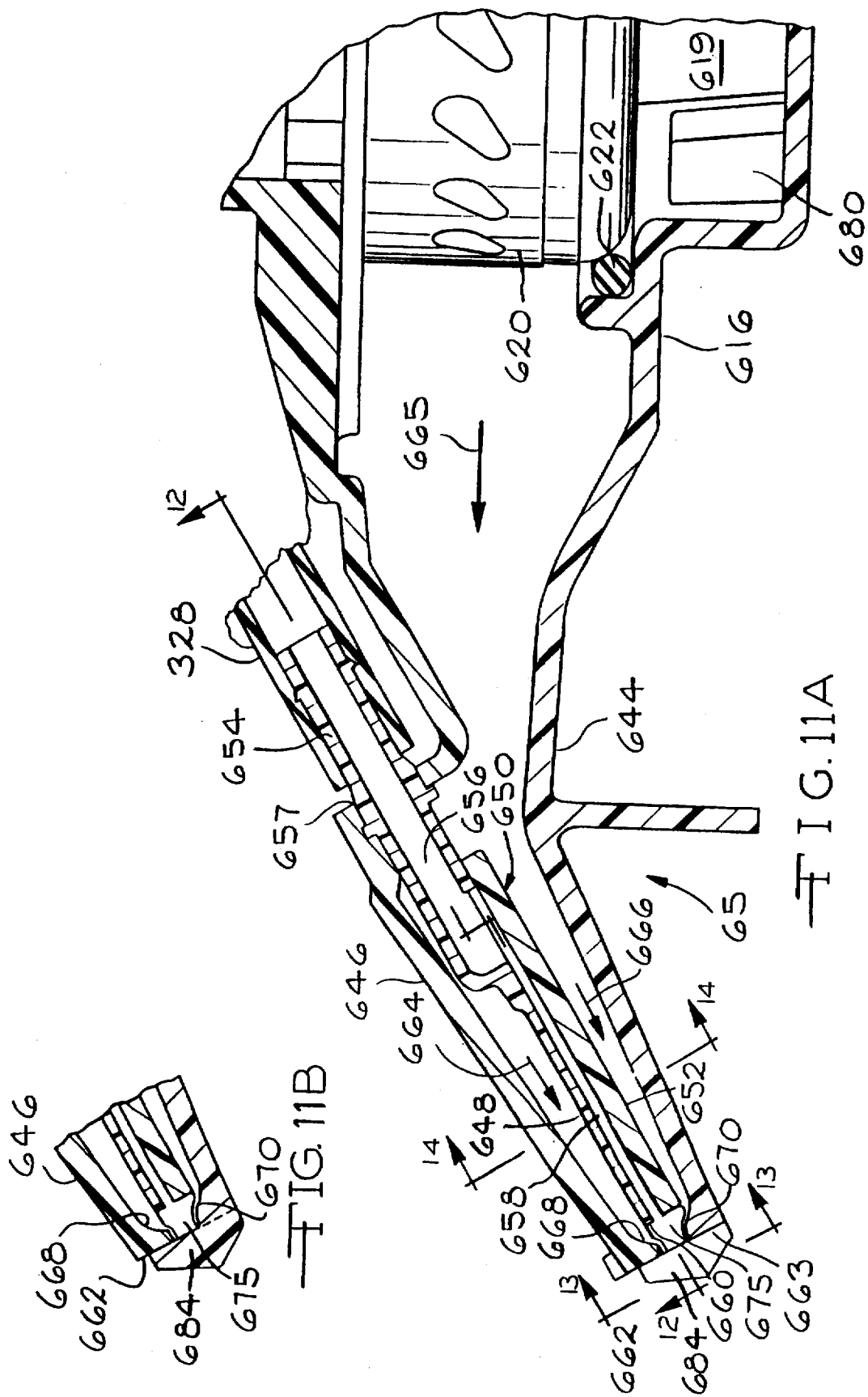

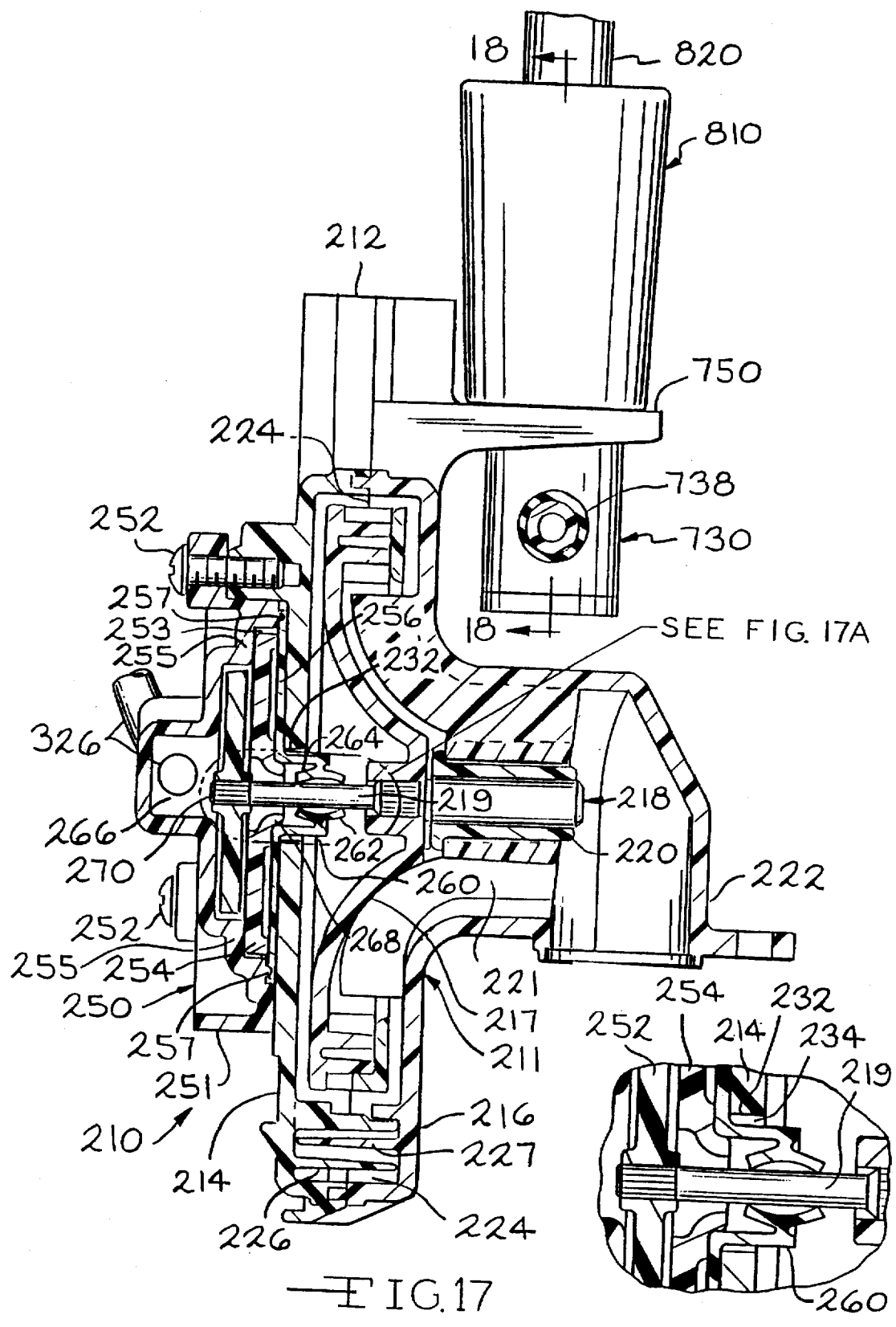

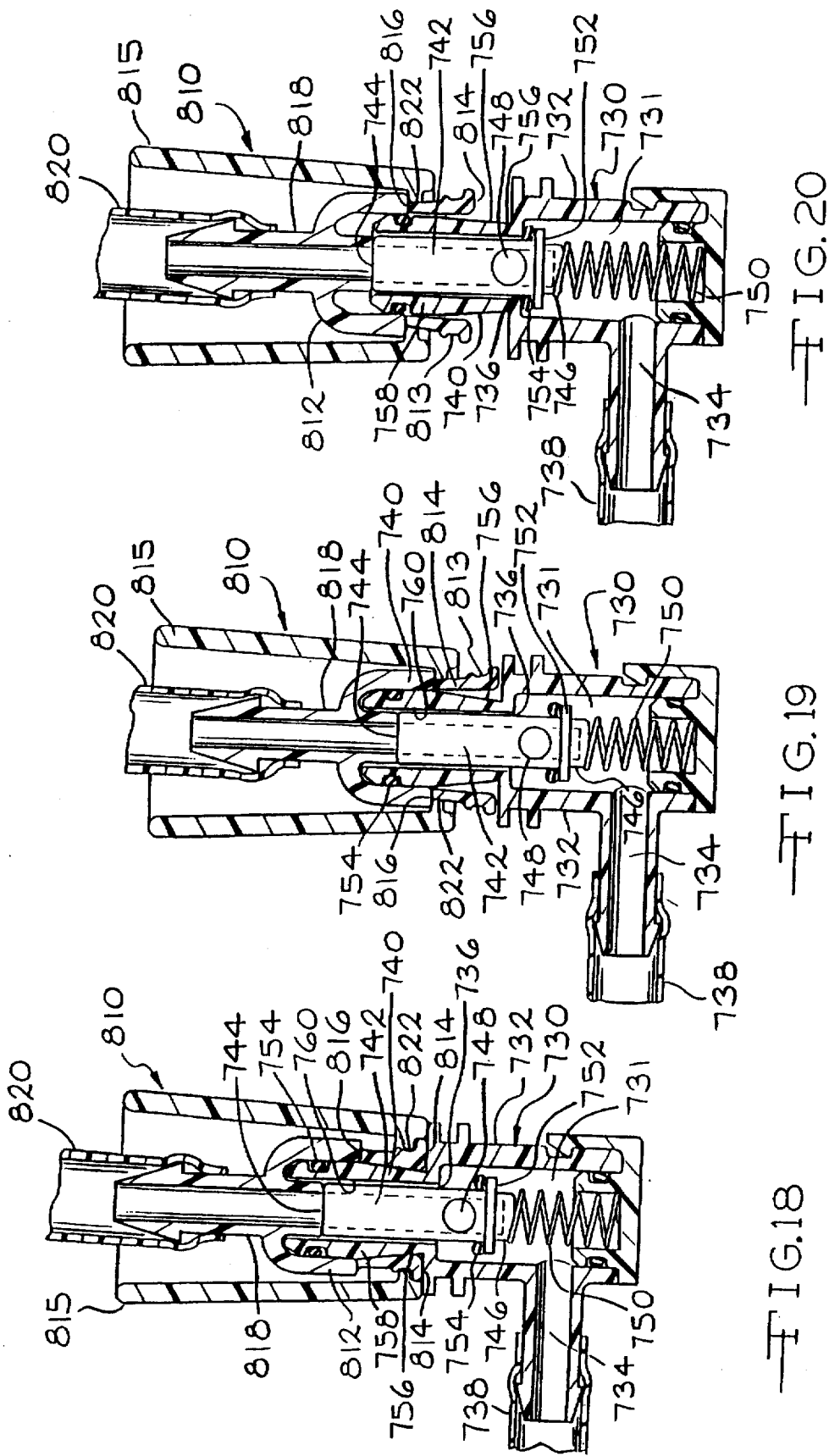

QUICK DISCONNECT COUPLING

BACKGROUND OF THE INVENTION

The present invention relates to a fluid carrying conduit quick disconnect coupling and more particularly to a coupling that is easily connected and/or disconnected. Such quick-disconnect couplings are commonly used on hot water carpet extractors for connecting cleaning fluid supply tubes or hoses.

In the art of quick-disconnect couplings, a typical type having axially extending securement fingers is disclosed in U.S. Pat. No. 5,029,904, "Quick Disconnect Coupling," issued to A. C. Hunt on Jul. 9, 1991. However, the Hunt patent teaches, as does many other prior art references, a sleeve member having axially extending fingers wherein the end of the fingers include inwardly directed tangs which engage a circumscribing groove on the tubular member as a circumscribing collar is axially translated over the fingers. Such couplings, although easily coupled together, may become difficult to release and separate because of the finger tangs tendency to remain engaged with the tubular member's groove upon retraction of the collar.

SUMMARY OF THE PRESENT INVENTION

The present invention solves the inherent disconnect problem of the prior art by eliminating the inwardly directed tangs of the axial fingers and the peripheral groove of the tubular member.

In accord with the present invention the tubular member is nipple shaped having a relatively large diameter at its distal end and a smaller diameter at its proximal end thereby defining a converging conical surface therebetween. When the two members are coupled together the fingers axially extending from the sleeve member are pressed inward against the converging conical surface of the tubular member by a circumscribing axially translatable locking collar thereby preventing separation of the two members until the locking collar is retracted. Upon retraction of the locking collar, the sleeve member and the fingers easily slide off the nipple shaped tubular member.

BRIEF DESCRIPTION OF THE DRAWINGS

FIG. 7 presents an exploded pictorial of the upright extractor's combined suction nozzle and hood illustrating the principal elements thereof.

FIGS. 8A and 8B present a side elevational cross-section taken vertically through the upright extractor illustrating the principal internal working elements.

FIG. 10 is an enlarged cross-sectional view of the atmospheric vent valve as indicated in FIG. 8A.

FIG. 11A is an enlarged cross-sectional view of the exhaust air distribution nozzle and cleaning solution distributor as indicated in FIG. 8B.

FIG. 11B is a partial cross-section view taken along line 11B—11B of FIG. 13.

FIG. 17 is a cross-sectional view of the air turbine solution pump assembly taken along line 17—17 in FIG. 6.

FIG. 17A is an enlarged cross-sectional view of the shaft seal as identified in FIG. 17.

FIG. 18 is a cross-sectional view taken along line 18—18 in FIG. 17 illustrating the solution supply coupling attached to the solution discharge valve.

FIGS. 19 and 20 are cross-sectional views similar to FIG. 18 sequentially illustrating the removal of the solution supply coupling from the solution discharge valve.

DETAILED DESCRIPTION OF THE INVENTION

Figure 1:
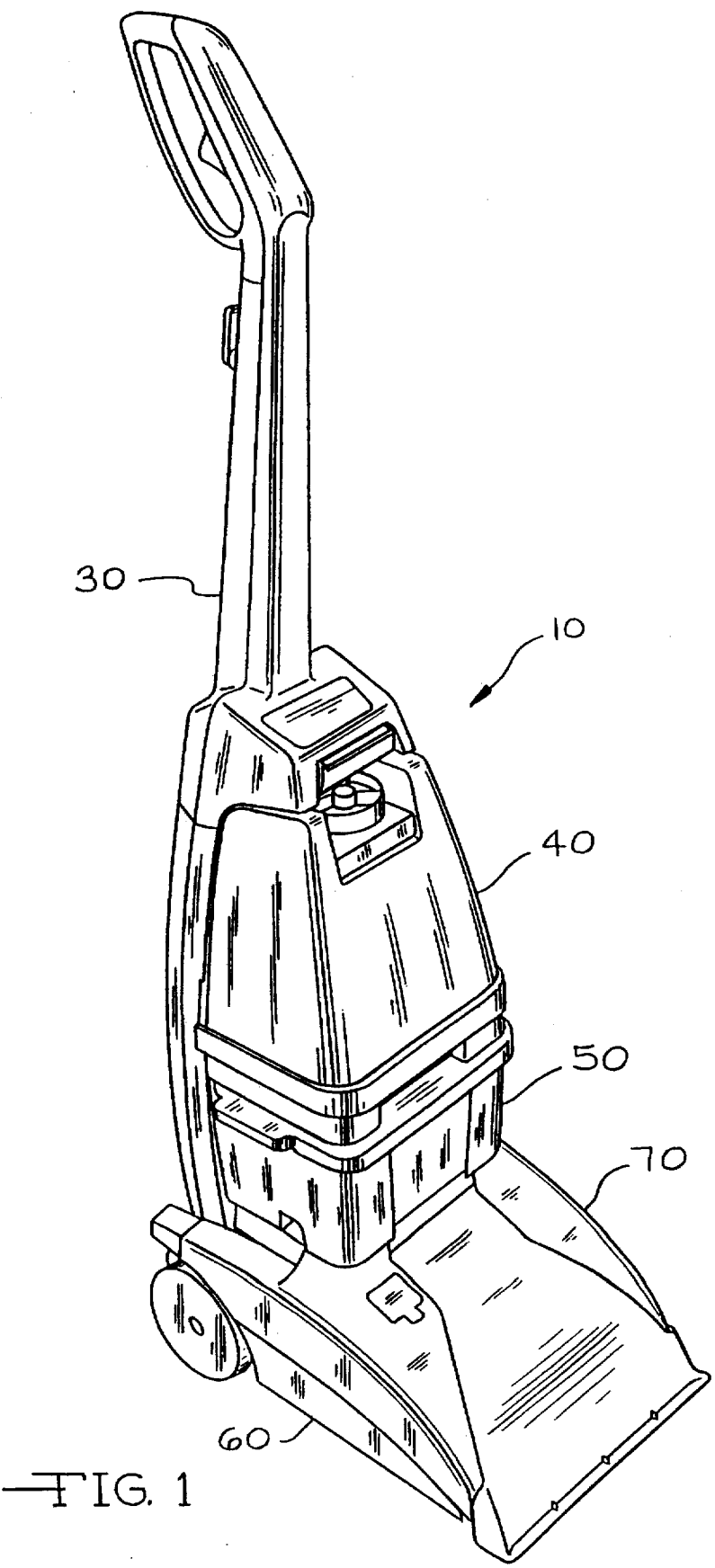
FIG. 1 presents a pictorial view of an upright carpet extractor embodying the present invention.
Figure 2:
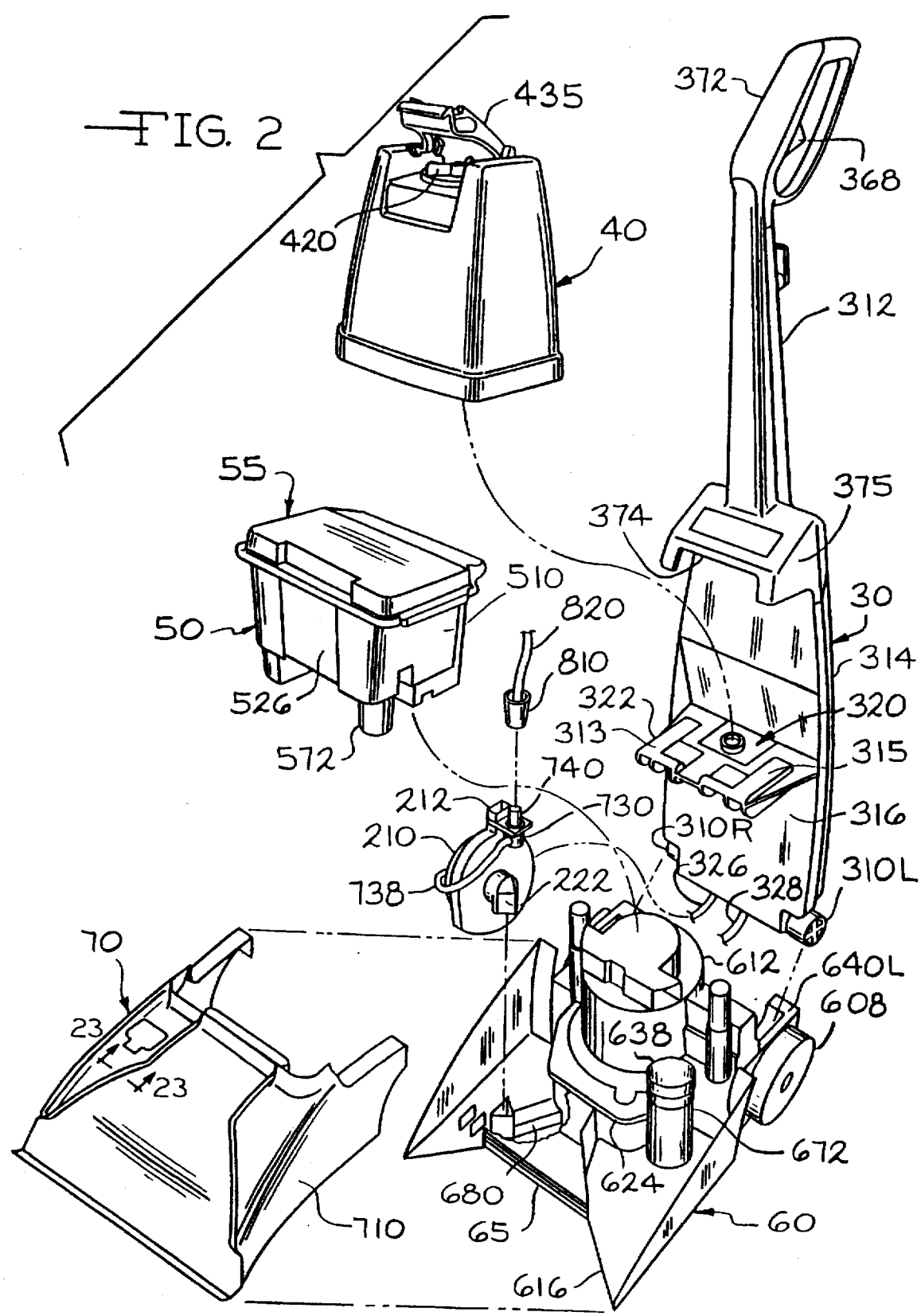
FIG. 2 presents an exploded view of a carpet extractor embodying the present invention illustrating the principal elements thereof.

FIGS. 1 and 2 present a pictorial and exploded view of an upright carpet extractor 10 embodying the present invention and illustrating the principal components and subassemblies thereof. Extractor 10 comprises a base frame assembly 60 upon which all other components or subassemblies are carried as best illustrated in FIG. 2. Specific details of base frame assembly 60 are further shown and illustrated in FIGS. 6 and 8B. Pivotally attached to base frame assembly 60 is handle assembly 30. Specific details of handle assembly 30 are further shown and illustrated in FIGS. 3, 8A, and 8B.

Removably supported upon handle assembly 30 is cleaning solution supply tank 40. Specific details of supply tank 40 are further shown and illustrated in FIGS. 4, 8A, and 8B.

Figure 8B:
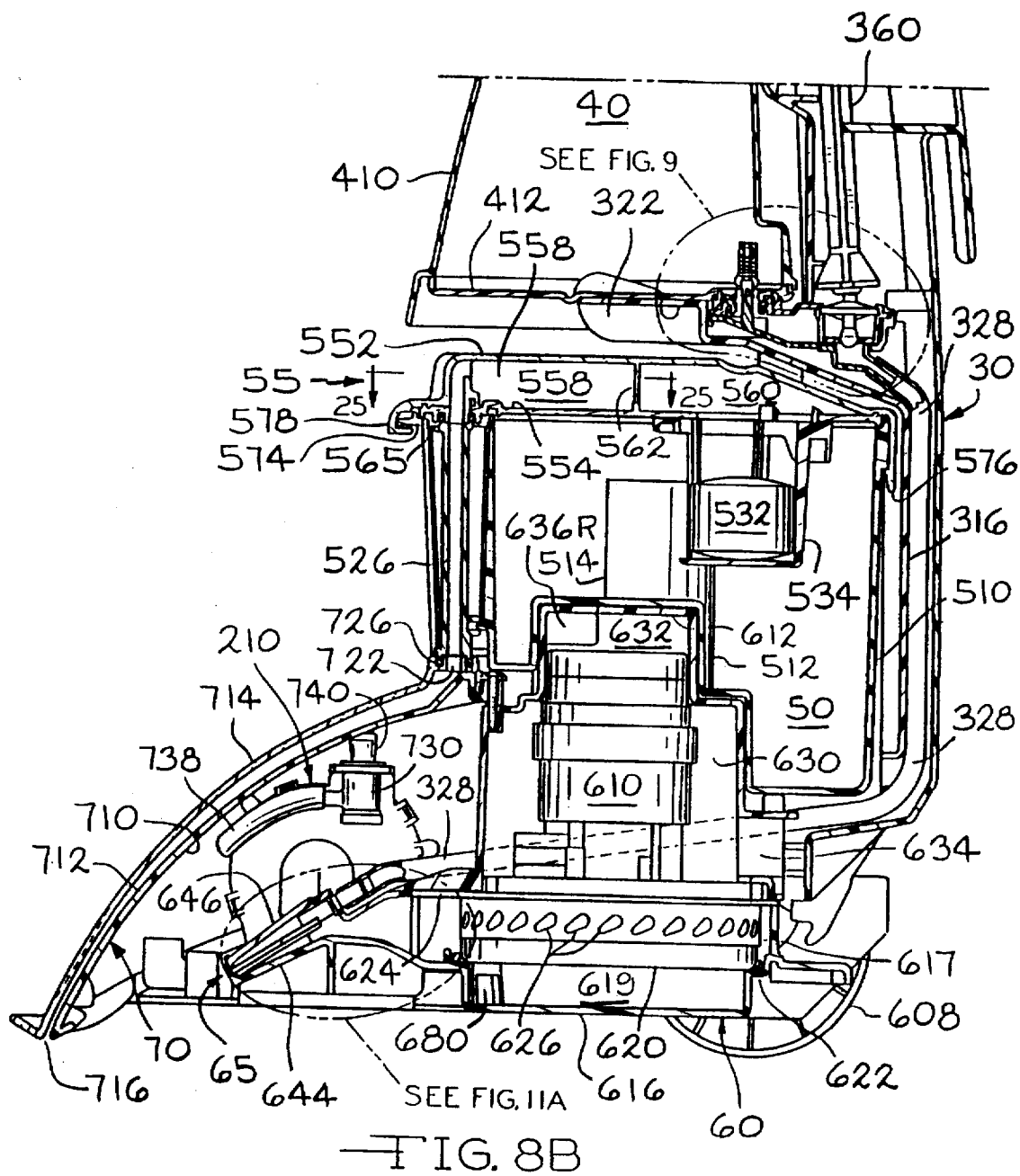

Removably setting atop base frame assembly 60 is a combined air/water separator and recovery tank 50. Specific details of the combination recovery tank 50 are further shown and illustrated in FIGS. 5 and 8B. Recovery tank 50 is configured to include a generally concave bottom 512 whereby tank 50 sets down over and surrounds a portion of the motor cover 612 of base frame assembly 60, as is best illustrated in FIG. 8B. It is preferred that recovery tank 50 set atop and surround a portion of the motor fan 610 thereby providing sound insulating properties and assisting in noise reduction of the extractor.

Fixedly attached to the forward portion of base frame assembly 60 is hood assembly 70 incorporating therein a floor suction nozzle. Specific details of hood assembly 70 are further shown and illustrated in FIGS. 7 and 8B.

Figure 6:
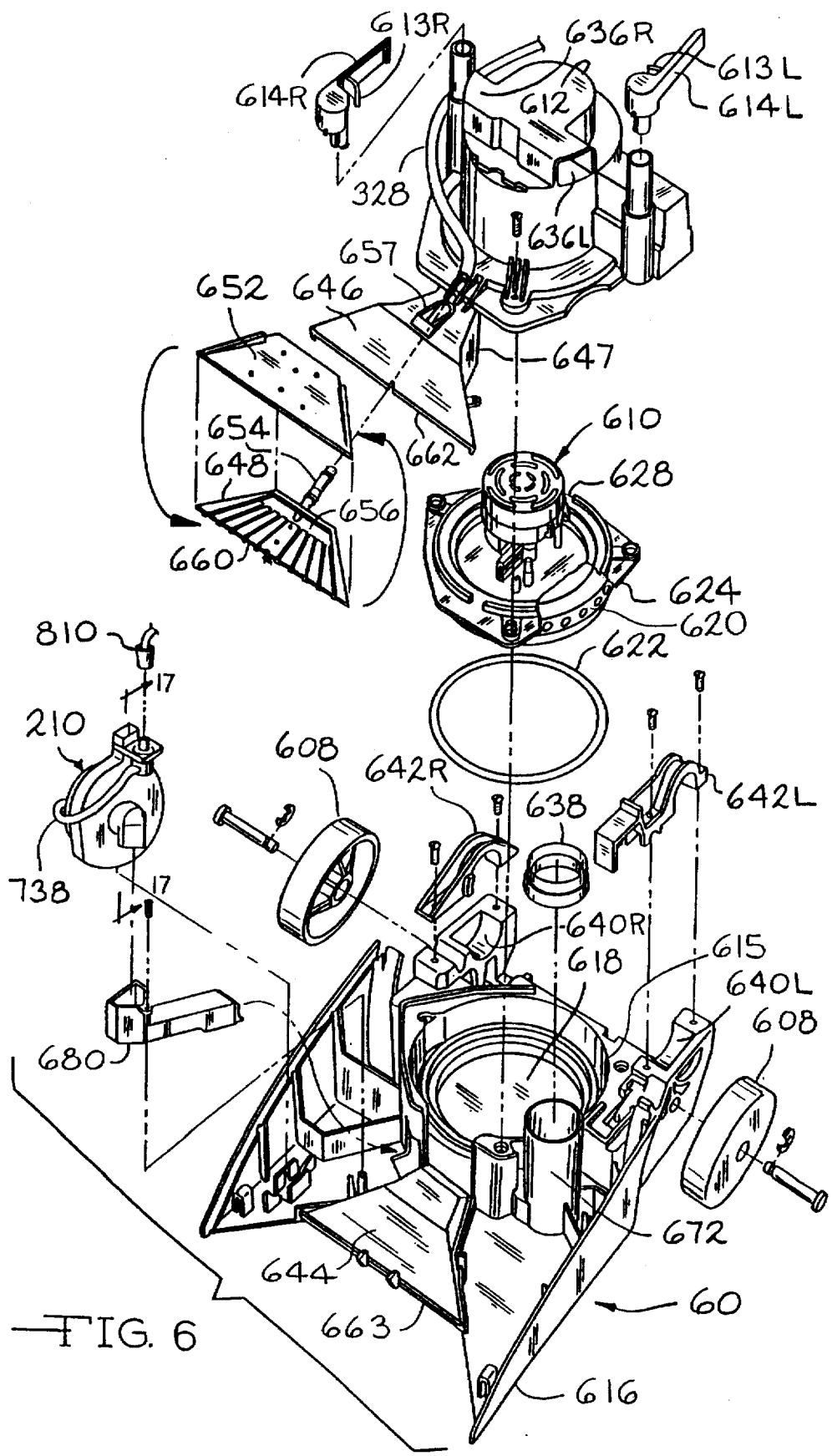
FIG. 6 presents an exploded pictorial of the upright extractor's base frame illustrating the principal elements thereof.

Referring now to FIGS. 2, 6 and 8B. The base frame assembly 60 generally includes a unitary molded base frame 616 having two laterally displaced wheels 608 suitably attached to the rear of the frame. Integrally molded into the bottom of frame 616 is a circular stepped basin 618 receiving therein the suction fan portion 620 of motor/fan assembly 610. The fan housing 620 of motor/fan assembly 610 rests upon the edge of stepped basin 618 having a sealing O-ring 622 therebetween thereby forming an inlet air plenum 619 about the fan eye. Mounting flange 624 of motor/fan assembly 610 similarly cooperates with ledge 615 of base frame 616 to form an exhaust air collecting ring 617 circumscribing the air exit ports 626 of the fan housing 620. Although prototype models have performed satisfactorily without a seal or gasket between flange 624 and ledge 615, it may be advantageous to place a seal or gasket therebetween to assure a leak-free juncture.

Motor cover 612 surrounds the motor portion 628 of motor/fan assembly 610 thereby defining a motor cooling air chamber 630 and a motor cooling exhaust manifold 632. Motor cooling air enters chamber 630 through a suitable inlet 634 and is exhausted through a fan (not shown) atop the motor into exhaust manifold 632 thereafter exiting through exhaust air outlet conduits 636L and 636R.

Integrally molded into base frame 616 is lower stand pipe 672 which sealing engages exit stand pipe 572 of recovery tank 510 via cylindrical seal 638 when tank 510 is placed atop motor cover 612 as best illustrated in FIG. 8B. Lower stand pipe 672 fluidly communicates with fan inlet plenum 619 thereby providing a vacuum source for recovery tank 510 as further described below.

Extending forward from motor cover 612 and integrally molded therewith is the top 646 and side walls 647 (the left side wall only being visible in FIG. 6) of the motor/fan working air discharge nozzle 65. Top 646 and side walls 647 join with bottom wall 644 (integrally molded into base frame 616) to form discharge nozzle 65 when motor cover 612 is placed atop motor/fan assembly 610.

Figure 5:
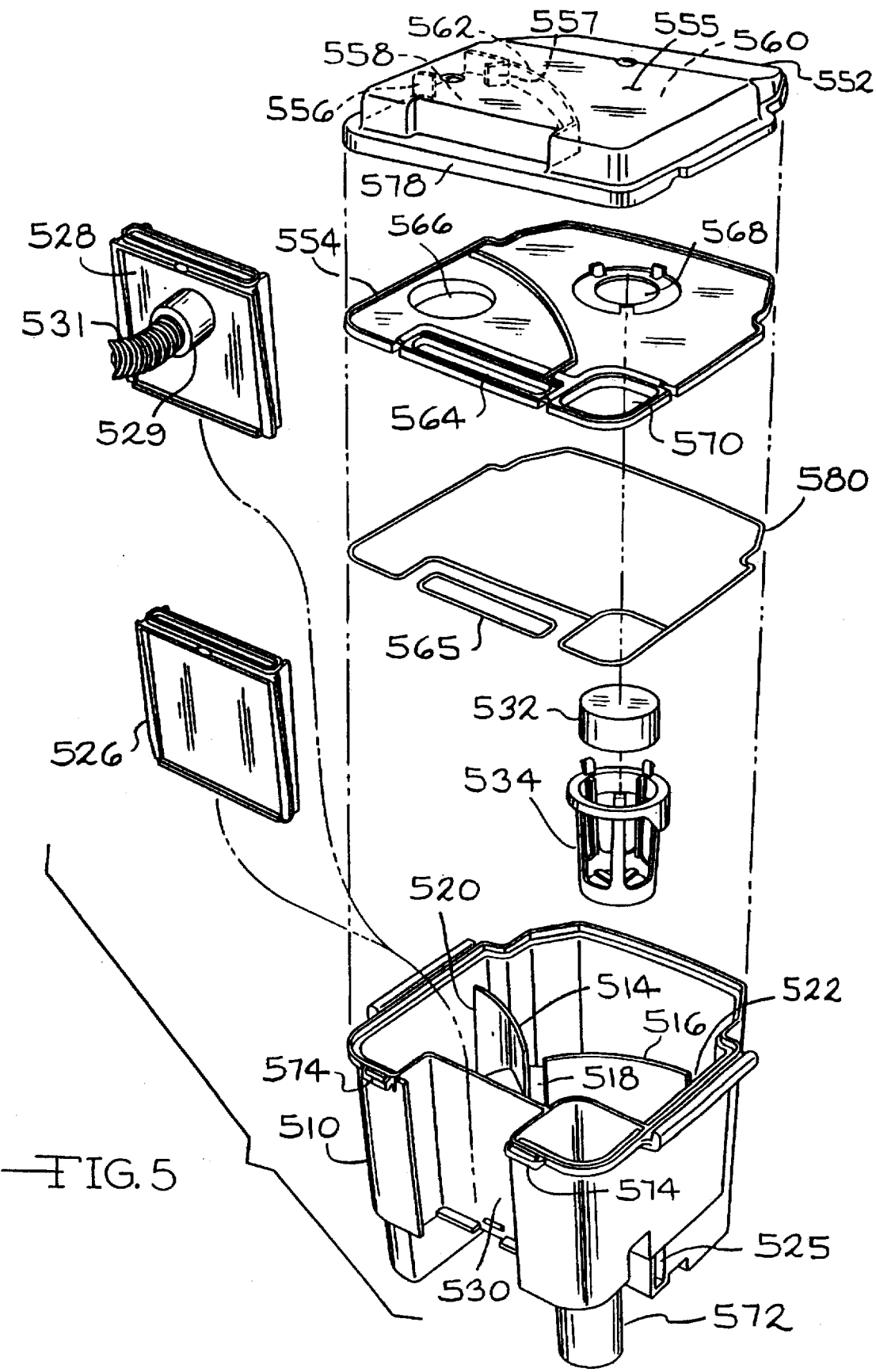
FIG. 5 presents an exploded pictorial of the air/fluid separator and liquid recovery tank illustrating the principal elements thereof.

Referring now to FIGS. 2, 5, and 8B. Recovery tank assembly 50 generally comprises an open top tank 510 wherein the bottom thereof 512 is configured to set atop and surround the top portion of motor cover 612 as best illustrated in FIG. 8B. Positioned inside tank 510 are two vertical baffles 514 and 516 which act to limit the degree of fluid sloshing during the forward and reverse push-pull operation of the extractor in the floor cleaning mode and assists in separation of liquid from the working air as described further below.

In addition to their function as anti-slosh baffles, baffles 514 and 516 also serve to prevent the establishment of a "short circuited" working airflow from exit opening 566 of inlet chamber 558 directly to inlet opening 568 of exit chamber 560. Baffles 514 and 516 act to disburse the incoming working air over that portion of the recovery tank's volume upstream of baffles 514 and 516 by forcing the working air to pass through openings 518, 520 and 522.

Thus the velocity of the air as it passes through tank 510 is slowed to a minimum value and the time that the working air spends within tank 510 is at a maximum thereby providing for more complete liquid precipitation.

Baffles 514 and 516 are affixed to floor 512 extending upward therefrom as illustrated in FIGS. 5 and 8B. It is preferred that baffles 514 and 516 are free standing having open space 518 therebetween and open space 520 and 522 between the tank side wall and baffle 514 and 516 respectively to permit the free flow of recovered fluid therepast. Tank 510 is releasably affixed to motor cover 612 by two rotatable latches 614L and 614R (FIG. 6) having curved tangs 613L and 613R slidingly received within slot 525, in the left and right side walls of tank 510. Slidingly received within offset 530 in the forward wall of tank 510 is module 526 for the floor cleaning mode or conversion module 528 for the upholstery cleaning mode.

The recovery tank lid assembly 55 incorporates therein an air/fluid separator comprising a hollowed lid 552 and bottom plate 554 sealingly welded together forming a plenum therebetween. The plenum is divided into two separate and distinct chambers, an inlet chamber 558 and exit chamber 560, by separator wall 562 integrally molded into lid 552 and extending between lid 552 and bottom plate 554. Inlet chamber 558 fluidly communicates with floor cleaning module 526 or the upholstery/stair module 528 through inlet opening 564 in bottom plate 554. Any suitable sealing means 565 may be used between the module 526 or 528 and inlet opening 564 such as rope seal 565. Rope seal 565, and all other rope seals identified herein are preferably made from closed cell extruded cellular rubber. An inlet chamber exit passageway 566 in bottom plate 554 provides fluid communication between tank 510 and inlet chamber 558. Similarly exit chamber 560 includes entrance passage 568, in bottom plate 554 providing fluid communication between tank 510 and exit chamber 560. It is preferable to provide a float 532 within a suitable float cage 534 to choke the flow of working air through passage 568 when the reclaimed fluid within recovery tank 510 reaches a desired level. Exit chamber 560 further includes discharge opening 570 for fluid communication with an integrally molded stand pipe 572 of tank 510 when lid assembly 55 is attached to the open top of tank 510.

Integrally molded into lid 552 so as to be positioned about the periphery of exit opening 566 in bottom plate 554 are two vortex impeding baffles 556 and 557. Baffle 556 attached to both the side wall 553 and top wall 555 extends outward over exit opening 566 on a radial line thereof and perpendicular to side wall 553. Baffle 557 attached to both the top wall 555 and separator wall 562 of lid 552 extends from separator wall 562 to the immediate edge of opening 566 positioned at an angle to separator wall 562 such that the extended plane of baffle 557 intersects side wall 553 at the intersection of baffle 556 and side wall 553 and at an angle of approximately 45° with respect to side wall 553.

Lid assembly 55 is removably attached to tank 510 by the engagement of tangs 574, in the forward rim 578 of lid 552 and a cantilevered latching tang 576 at the rear of tank 510. Any suitable sealing means such as rope seal 580 may be used to seal the air/water separator assembly 55 from the recovery tank 510.

Referring now to FIGS. 2, 7, 8B, and 23, nozzle assembly 70 encloses the front portion of base frame 616 generally comprising a front hood 710 which is affixed to base frame 616. The forward portion of hood 710 incorporates therein a depressed zone 712 which, in cooperation with nozzle cover 714, forms a suction nozzle having an elongated inlet slot 716 laterally extending the full width of hood 710. Extending around the perimeter of depressed zone 712 is groove 718 which receives therein rope seal 720 and peripheral flange 719 of cover 714 thereby limiting all air entry, into the composite suction nozzle, to slot 716. Cover 714 further incorporates therein an integrally molded elongate discharge opening 722 circumscribed by groove 724 having rope seal 726 therein for sealingly engaging module 526 whereby the suction nozzle fluidly communicates with module 526. Cover 714 is preferably affixed to hood 710 by three screws as illustrated in FIG. 7.

When it is desired to convert to the upholstery and/or stair cleaning mode, floor module 526 is slidingly removed from slot 530 in the front wall of tank 510 and replaced with upholstery module 528. With upholstery module 528 in place all working air enters through hose inlet 529 thereby by passing the floor suction nozzle. Conversion from floor to above floor cleaning is discussed further below.

Referring now to FIGS. 2, 3, 6, 8A, and 8B, base frame 616, at the rear thereof, has integrally molded journals 640L and 640R for rotatingly receiving therein trunnions 310L and 310R of handle assembly 30. Trunnions 310L and 310R are rotatingly retained in place by trunnion retainers 642L and 642R, respectively.

Figure 3:
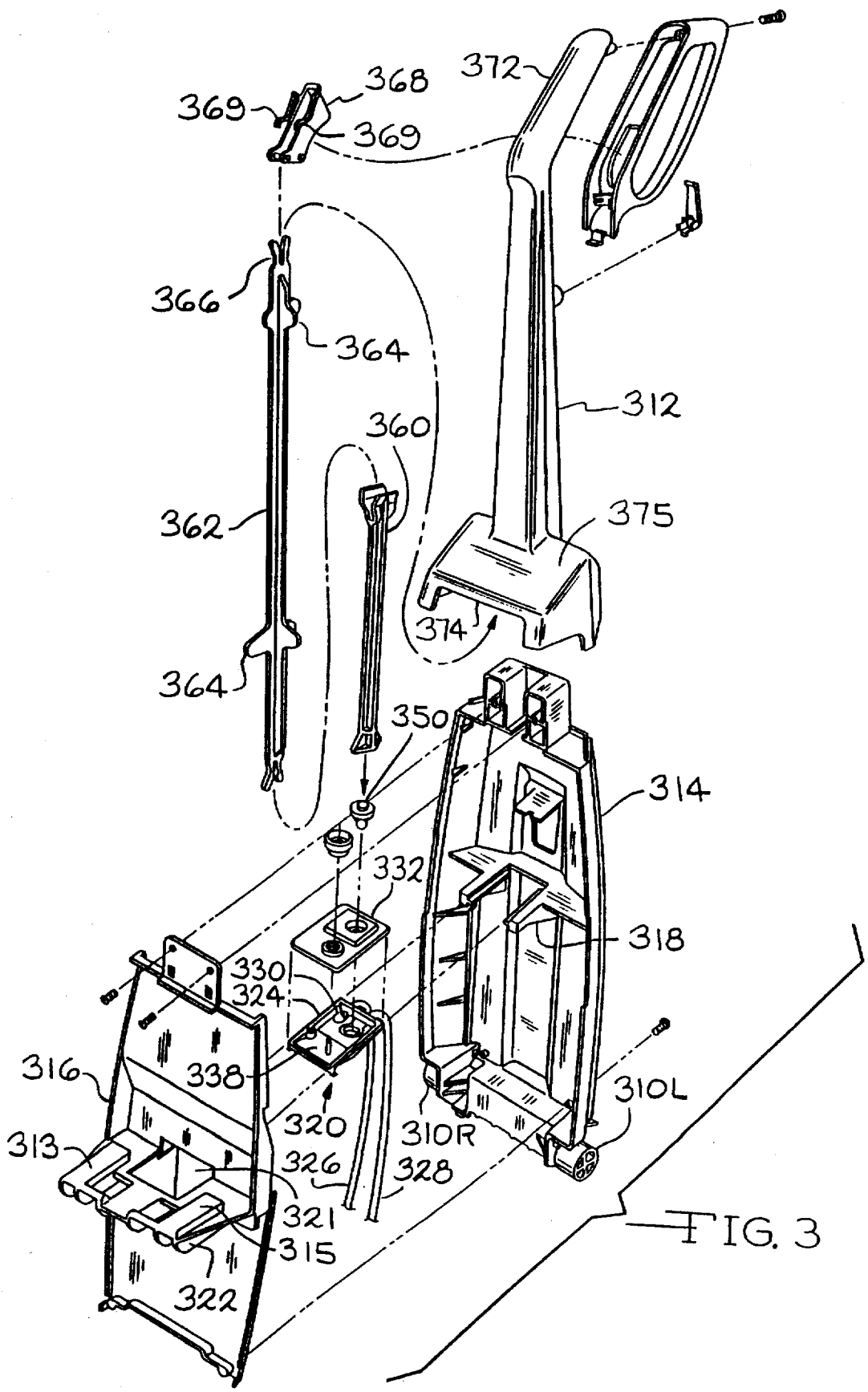
FIG. 3 presents an exploded view of the handle portion of the upright extractor illustrating the principal elements thereof.

Handle assembly 30 basically comprises an upper handle portion 312, lower body shell 314 and body shell face plate 316. The lower body shell 314 has integrally molded therein a cleaning solution reservoir support shelf 318 that has attached thereto, as generally illustrated in FIG. 3, a cleaning solution reservoir assembly 320. Reservoir 320 receives and holds a quantity of cleaning solution from supply tank 40 for distribution to supply tubes 326 and 328 as further described below. Upon assembly of face plate 316 to the lower body shell 314, the forward half of reservoir 320 protrudes through aperture 321, of face plate 316 aligning with the top surface of support shelf 322, as best seen in FIG. 2, such that the top surface of reservoir 320 is generally planer with the top surface of shelf 322. The handle assembly 30 is completed by fixedly attaching the upper handle 312 to the combined body shell 314 and face plate 316 by telescopingly sliding upper handle 312 downward over attachment posts 311 of lower body shell 314 and securing with two screws (not shown).

Figure 9:
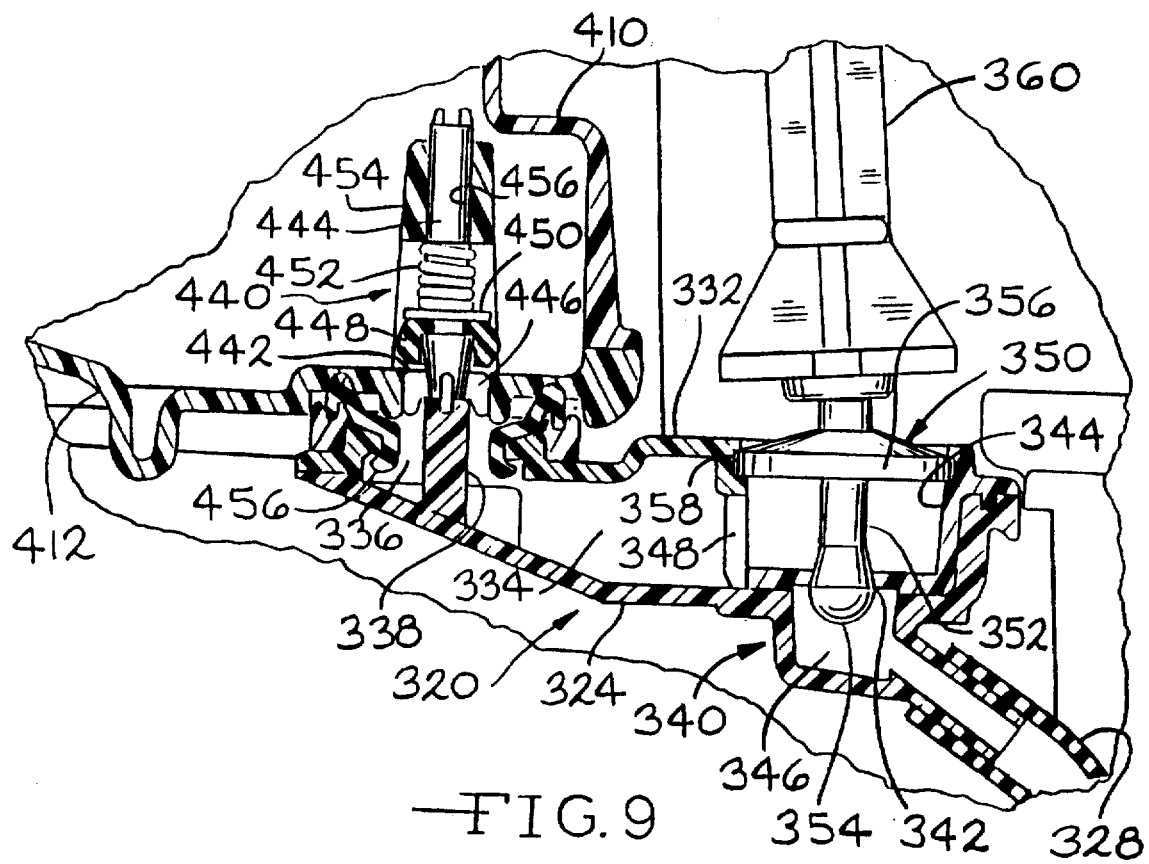
FIG. 9 is an enlarged cross-sectional view of the solution supply reservoir as identified in FIG. 8B.
Figure 15:
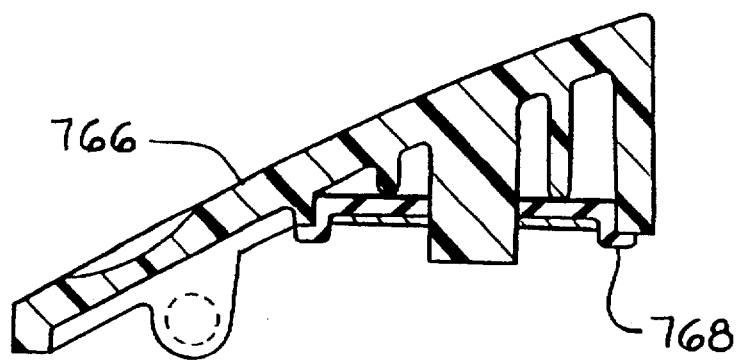
FIG. 15 is a sectional view of the air turbine inlet door taken along line 15—15 in FIG. 7.

Referring now to FIGS. 3, 8B, and 9. Cleaning solution reservoir 320 includes a bottom concave basin 324 having two supply tubes 326 and 328 exiting therefrom. Supply tube 326 provides a direct supply of cleaning solution, through discharge port 330, from reservoir 334 to auxiliary air turbine driven pump assembly 210 (FIG. 2), while supply tube 328 provides a valved release of cleaning solution from reservoir 334 to the cleaning solution distributor 65.

Cover plate 332 is sealingly attached to basin 324 thereby forming reservoir volume 334 which supply tank 40 floods with cleaning solution through inlet port 336. Extending axially upward through inlet port 336 is pin 338 which acts to open supply valve 440 of supply tank 40 as tank 40 is placed upon support shelf 322 and secured in place. The structure and operation of supply valve 440 is described further below.

Cleaning solution is released, upon operator demand, into tube 328 through solution release valve 340 which comprises valve seat 342 positioned in basin 324 of bowl 344 integrally formed with top cover 332. The basin 324 of bowl 344 extends across discharge port 346 such that valve seat 342 is aligned to open thereinto. An opening 348, within the wall of bowl 344, permits the free flow of cleaning solution from reservoir 334 into bowl 344. An elastomeric valve member 350 comprises an elongate piston 352 extending through valve seat 342 having a bulbous nose 354 at the distal end thereof within discharge port 346 as best illustrated in FIG. 9. Valve member 350 is preferably made from Monsanto "SANTOPRENE" 201-55 elastomeric material. The opposite end of piston 352 includes a downwardly sloped circular flange 356, the peripheral end of which frictionally and sealingly engages the upper circular rim 358 of bowl 344 thereby preventing leakage of cleaning solution thereby. Flange 356 acts to bias piston 352 upward thereby urging nose 354 into sealing engagement with valve seat 342 preventing the flow of cleaning solution from bowl 344 into discharge port 346 and tube 328.

The solution release valve 340 is operated by pressing downward upon the elastomeric release valve member 350 by push rod 360 thereby deflecting the center of flange 356 downward urging nose 354 downward and away from valve seat 342 permitting the passage of cleaning solution therethrough into discharge port 346 and tube 328. Energy stored within flange 356, as a result of being deflected downward will, upon release of the force applied to push rod 360, return the valve to its normally closed position as illustrated in FIG. 9.

Referring now to FIGS. 3, 8A, 8B, and 9. Extending upward through handle assembly 30 is an articulated push rod comprising a lower rod 360 pivotly connected to upper rod 362. Push rods 360 and 362 are positioned within the handle assembly 30 by means of integrally molded spacers 364 dimensioned and located as necessary. The upper end 366 of push rod 362 is pivotally attached to trigger 368. Integrally molded onto trigger 368 are two cantilever springs 369, one on each lateral side thereof. Trigger 368 is pivotally attached to the handle at pivot 370; thus cantilever springs 369 urge trigger 368 and the attached articulated push rod 360, 362 towards the valve closed mode as illustrated in FIG. 8A. Cantilever springs 369 are engineered to support the combined weight of push rods 360 and 362 such that no force is applied to elastomeric valve member 350. Upon the operator squeezing the hand grip 372 and trigger 368, cantilever springs 369 yield thereby permitting counterclockwise rotation of trigger 368 about pivot 370 with a resulting downward movement of push rods 360 and 362 thereby opening solution release valve 340 causing gravitational flow of cleaning solution from reservoir 334 to tube 328. Upon release of trigger 368 energy stored in the system returns valve 340 to the closed mode.

The pivotal connections between push rods 360 and 362, between trigger 368 and push rod 362, and between trigger 368 and handle 312 generally comprise a pivot pin snappingly received within a detent formed between the legs of a two pronged snap as best seen in FIG. 8A at pivot 366 between push rod 362 and trigger 368.

Figure 4:
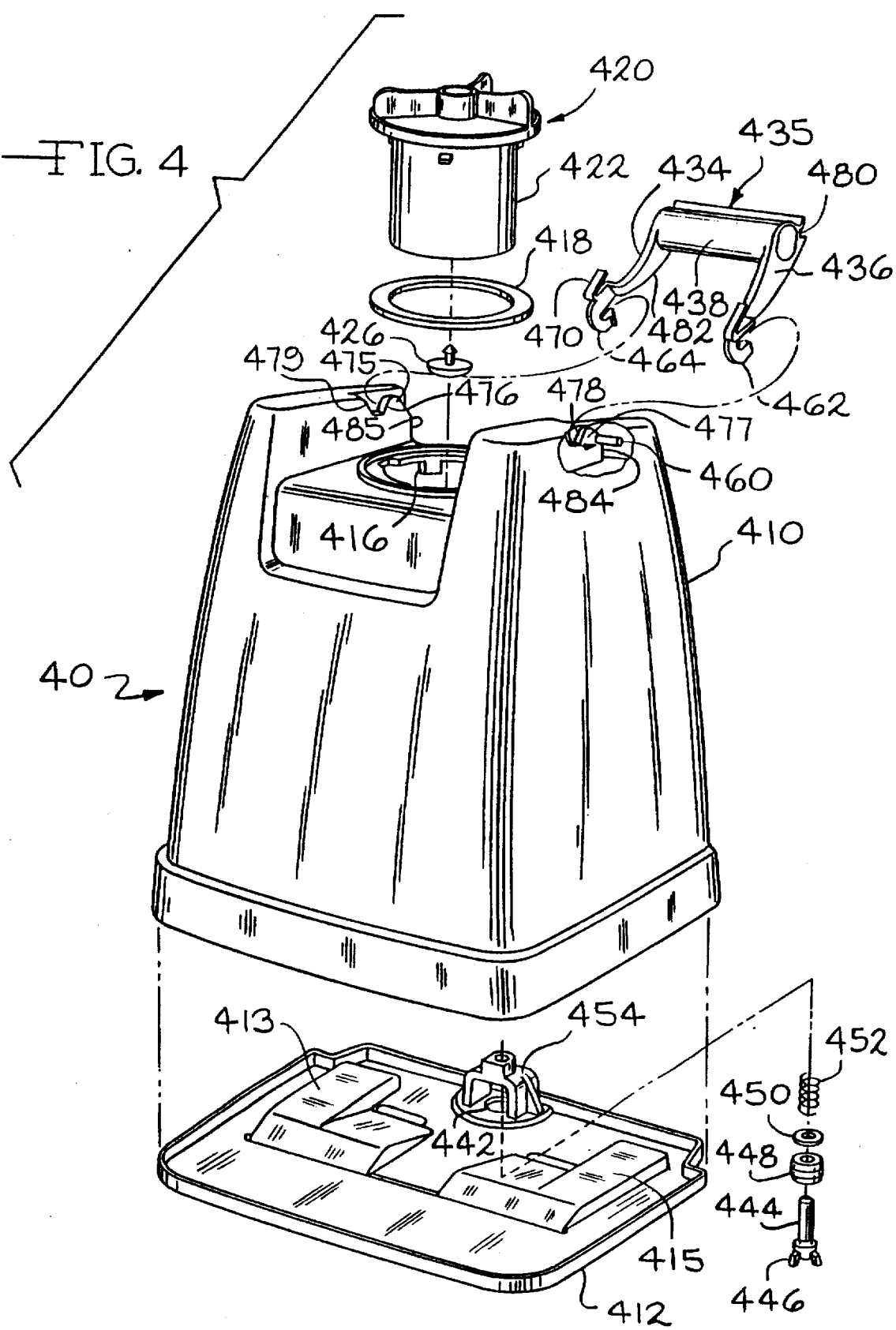
FIG. 4 presents an exploded pictorial of the solution supply tank illustrating the principal elements thereof.

Referring now to FIGS. 2, 3, 4, 8B and 9. Removably supported upon support shelf 322 of handle assembly 30 is cleaning solution supply tank 40. As illustrated in FIG. 4, supply tank 40 basically comprises a deeply hollowed upper body 410 and a relatively planer bottom plate 412 which is fusion welded, about its periphery, to the upper body 410. The bottom plate 412 is provided with suitable recessed areas 413 and 415 which index upon and receive therein corresponding raised portions 313 and 315 on support shelf 322, of handle assembly 30, when supply tank 40 is placed upon shelf 322.

Incorporated into bottom plate 412 of tank 40 is a solution release valve mechanism 440 comprising valve seat 442 having an elongate plunger 444 extending coaxially upward therethrough. Plunger 444 having an outside diameter less than the inside diameter of valve seat 442 is provided with at least three flutes 446 to maintain alignment of plunger 444 within valve seat 442 as plunger 444 axially translates therein and permits the passage of fluid therethrough when plunger 444 is in the open position.

An open frame housing 454 is located atop valve seat 442 having a vertically extending bore 456 slidingly receiving therein the upper shank portion of plunger 444. An elastomeric circumferential seal 448 circumscribes plunger 444 for sealingly engaging valve seat 442. Seal 448 is urged against valve seat 442 by action of compression spring 452, circumscribing plunger 444, and positioned between frame 454 and seal 448 preferably with a washer 450 therebetween. Solution release valve 440 is normally in the closed position. However, as supply tank 40 is placed upon support shelf 322 of handle 30, pin 338 of the cleaning solution supply reservoir 320 aligns with plunger 444 and is received within flutes 446, as best illustrated in figure 9, thereby forcing plunger 444, upward compressing spring 452, and opening valve seat 442 permitting cleaning solution to flow from tank 40 into reservoir 320. Upon removal of tank 40 from support shelf 322 the energy stored within compression spring 452 closes valve seat 442.

Referring now to FIGS. 4, 8A, and 10. Located at the top of tank 40 is fill opening 416 through which tank 40 may be conveniently filled with cleaning solution. To assure that the ambient pressure within tank 40 remains equal to atmospheric, as cleaning solution is drawn from tank 40, a check valve is provided in the top of cap 420 comprising a multiplicity of air breathing orifices 424 and an elastomeric umbrella valve 426. As the ambient pressure within tank 40 drops, by discharge of cleaning solution from therein, atmospheric pressure acting upon the top side of umbrella valve 426 causes the peripheral edge 428 to unseat from surface 432 of cap 420 thereby permitting the flow of atmospheric air into tank 40 until the ambient pressure therein equals atmospheric. Once the pressure on both sides of the umbrella valve equalize, the energy stored by deflection of the umbrella valve causes the peripheral edge 428 to reseat itself against surface 432 thereby preventing leakage of cleaning solution through orifices 424 during operation of the extractor.

Cap 420 and flat circular seal 418 sealingly close opening 416. Cap 420 incorporates an inverted cup portion 422 which serves as a convenient measuring cup for mixing an appropriate amount of concentrated cleaning solution with water in tank 40. When cap 420 is inverted and used as a measuring cup, liquid pressure against umbrella valve 426 further urges peripheral edge 428 against surface 432 thereby providing a leak free container.

Figure 21:
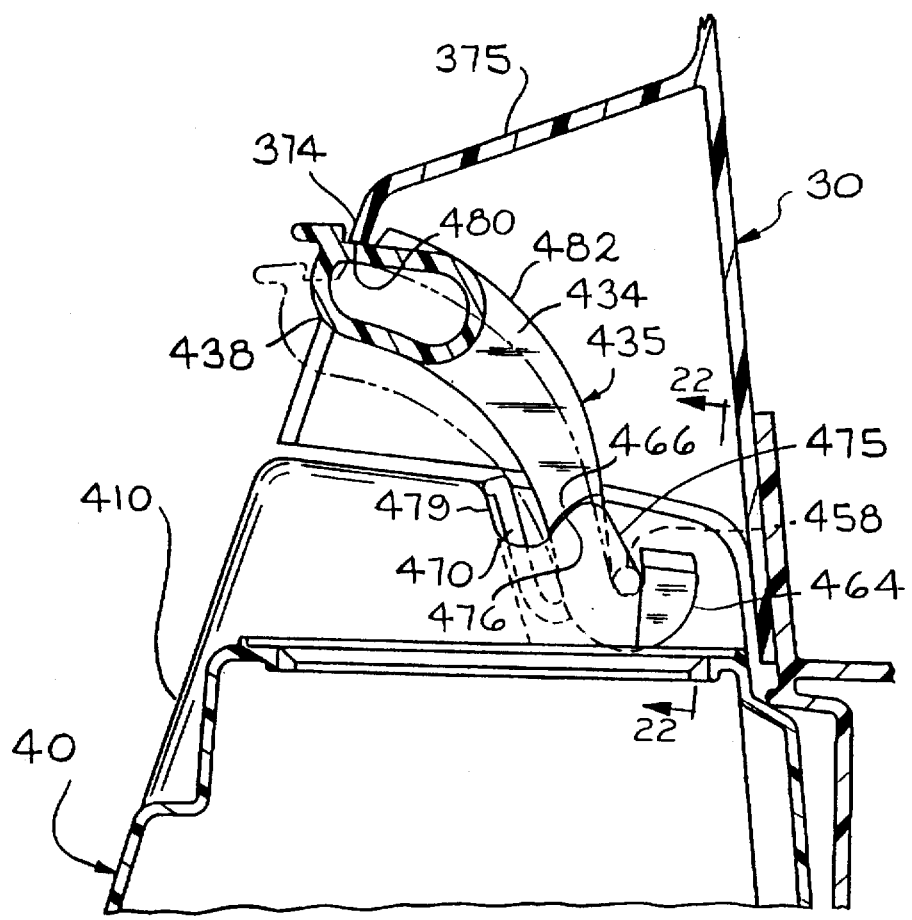
FIG. 21 is an enlarged cross-sectional view of the solution supply tank latching handle as identified in FIG. 8A.
Figure 22:
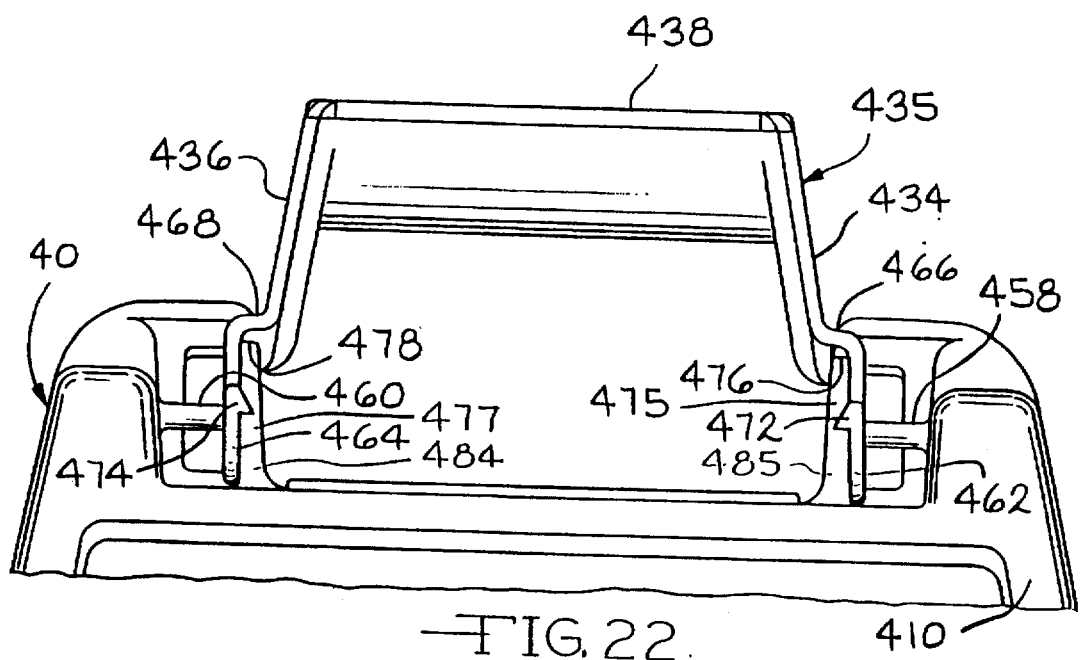
FIG. 22 is an elevational view taken along line 22—22 of FIG. 21.

Referring now to FIGS. 2, 4, 8A, 21, and 22, the solution supply tank 40 includes a combination carrying handle and tank securement latch 435 providing a convenient means for carrying the tank and/or securing the tank to the extractor handle assembly 30. Tank handle 435 comprises a generally horizontal handle bar portion 438 having arcuate camming arms 434 and 436 integrally attached at each end thereof. The two camming arms 434 and 436 are generally parallel, as best seen in figure 22, each terminating with an approximately 180° bend 464 and 462 at the end thereof. "U" shaped bends 464 and 462 form journals for receiving therein and rotatably attaching to pins 460 and 458 of the supply tank upper body 410 thereby supporting supply tank 40 therefrom when carried by handle 435.

Each arm 434 and 436 includes a lateral offset 466 and 468 which cam upon surfaces 476 and 478, of rails 475 and 477 respectively, as handle 435 rotates counterclockwise about pins 458 and 460 as viewed in FIG. 21. Further, as handle 435 rotates counterclockwise, integrally molded cantilever spring 470 (one preferably associated with each arm 434 and 436) acting upon surface 479 bends, thereby storing energy therein biasing handle 435 clockwise.

When tank 40 is placed upon support shelf 322 of handle assembly 30 and rotated clockwise (as viewed in FIG. 21) into the installed position, camming surface 482 (provided upon each arm 434 and 436) engages and cams upon edge 374 of hood 375 forcing handle 435 downward until notch 480, on handle bar 438, entraps edge 374 therein thereby securing tank 40 in place. To release tank 40 the operator grasps handle bar 438 pulling it downward against the retarding force of cantilever springs 470, as illustrated in FIG. 21 by broken lines, thereby releasing notch 480 from locking engagement with edge 374 of hood 375 and removes tank 40 from support shelf 322 of extractor handle assembly 30. The camming action of offset 466 and 468 upon camming surfaces 478 and 476 act to maintain the 180° bends 462 and 464 in contact with pins 458 and 460, respectively and provide a retarding force, against rails 475 and 477, securing tank 40 in place so long as handle bar 438 latchingly engages hood 375. Laterally extending tangs 472 and 474 provide rotational stops which engage surfaces 484 and 485 thereby preventing over travel of handle 435 and inadvertent removal of the handle from pins 458 and 460.

Turning now to FIGS. 6, 8B, 11A, 11B, 12, 13, and 14. The suction fan discharge nozzle 65 is cooperatively formed by nozzle bottom plate 644 integrally molded into base frame 616 and top cover 646 integrally molded onto motor cover 612. Positioned within discharge nozzle 65 is the cleaning solution distributor 650 comprising an upper distribution plate 648 and a lower cover plate 652. Plates 648 and 652 are shown in an inverted position (rotated 180 degrees) in FIG. 6 to better illustrate the inside surface of distribution plate 648.

Figure 12:
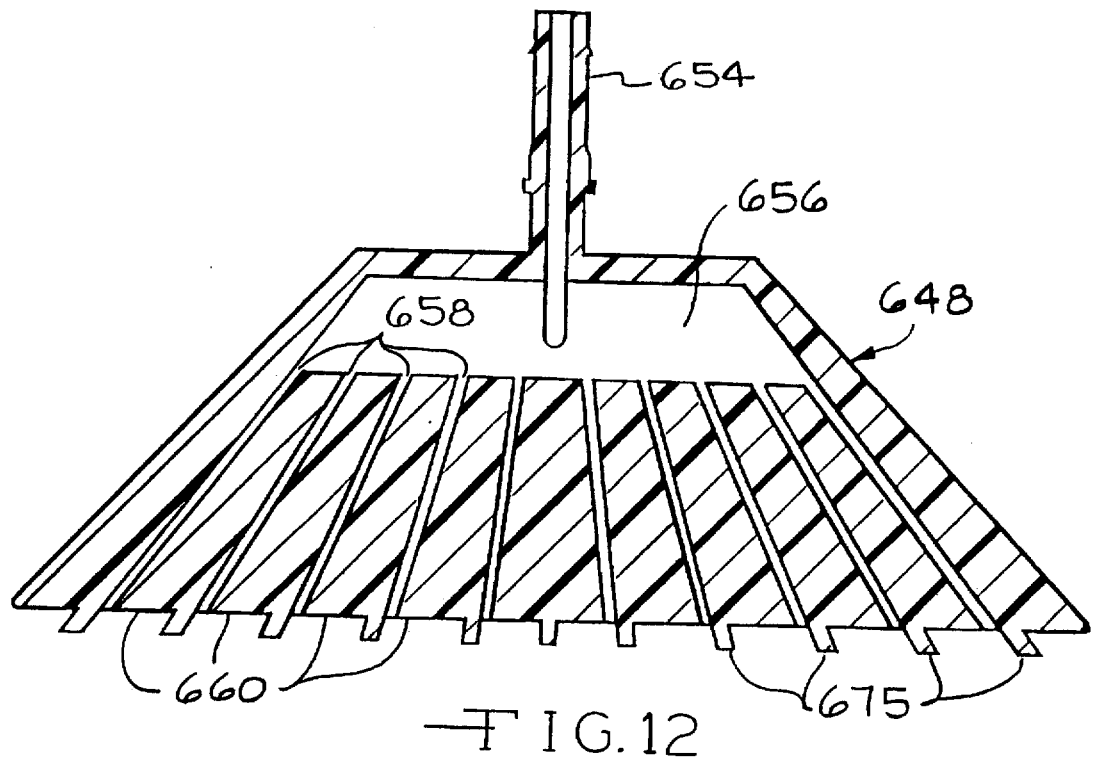
FIG. 12 is a sectional view taken along line 12—12 of FIG. 11.
Figure 13:
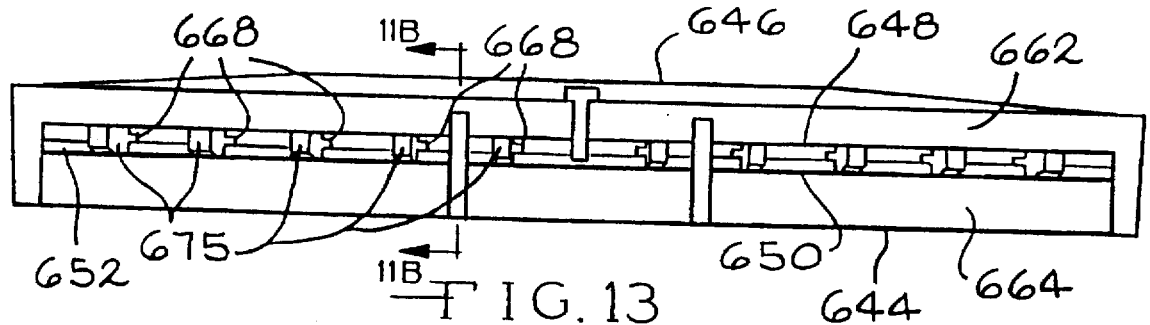
FIG. 13 is an elevational view taken along line 13—13 in FIG. 11 illustrating the exit end of the exhaust air distribution nozzle.
Figure 14:
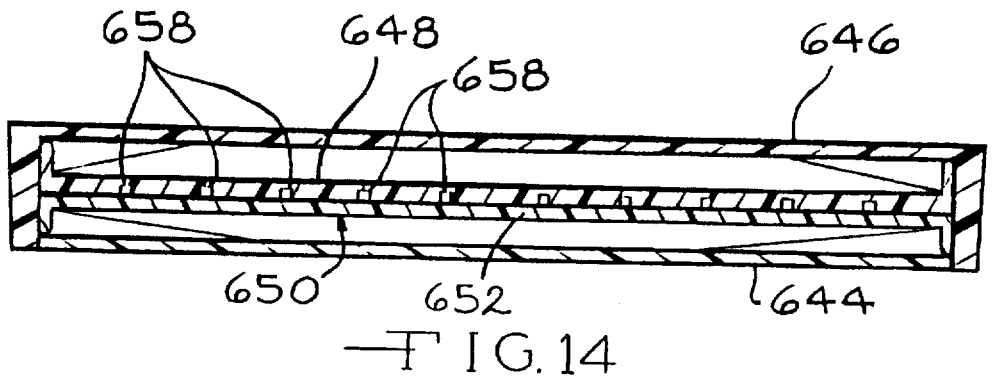
FIG. 14 is a sectional view taken along line 14—14 in FIG. 11.
Figure 16:
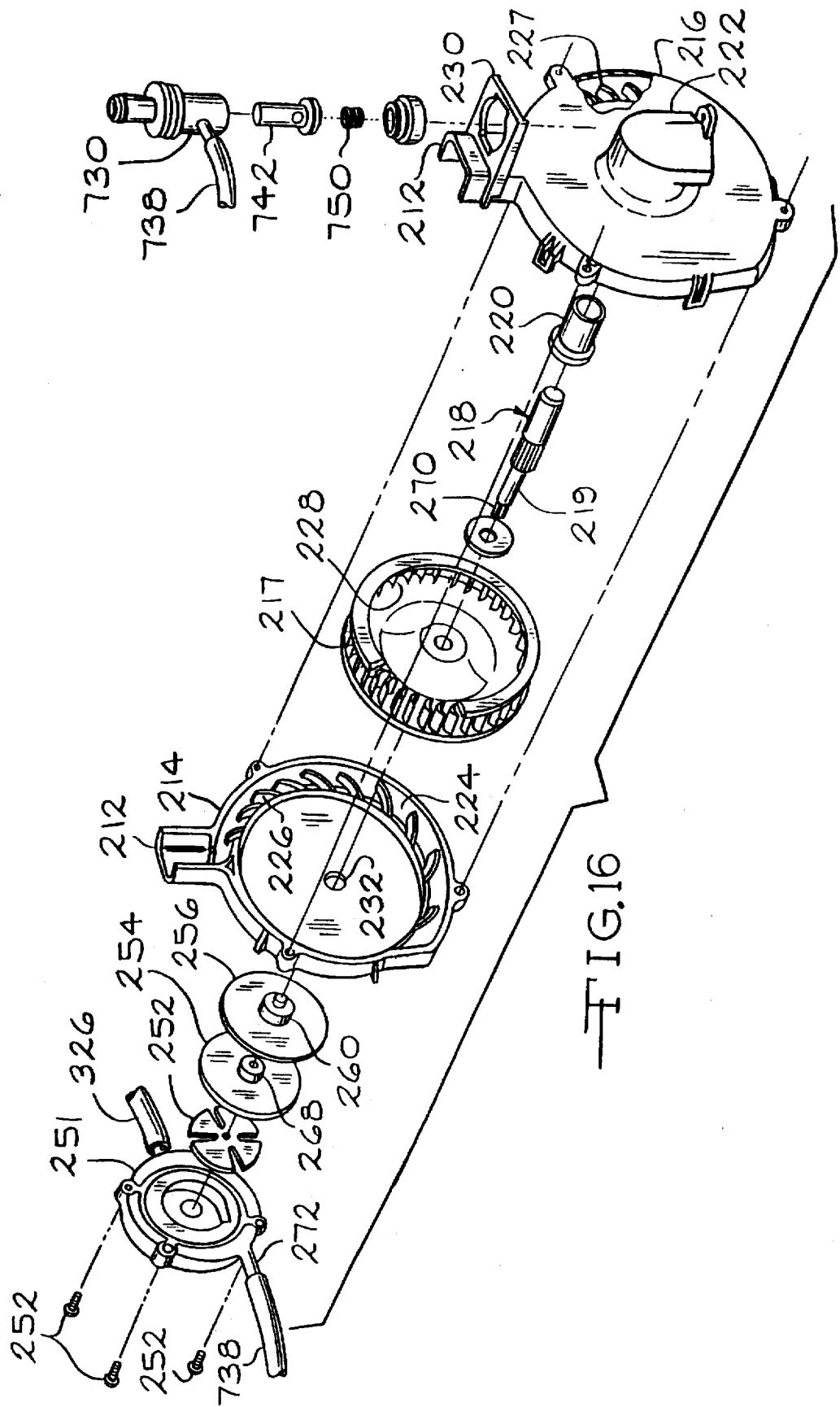
FIG. 16 is an exploded pictorial illustrating the elements comprising the air turbine solution pump assembly.

The upper distribution plate 648 includes, molded integral therewith, cleaning solution inlet tube 654 which projects through opening 657 of top cover 646 and fluidly connects to the distributor supply hose 328. Recessed within top cover 648 is a liquid supply manifold 656 fluidly communicating with supply hose 328 via inlet tube 654. Also recessed within the inner surface of top cover 648 and fluidly communicating with manifold 656 are a multiplicity of fluid conveying ducts 658 emanating from manifold 656, as best illustrated in FIG. 12, and terminating at the lateral edge 660 of upper plate 648. Lower plate 652 generally comprises a flat plate that when welded to or otherwise sealingly attached to upper plate 648 cooperates therewith to complete manifold 656 and its emanating fluid ducts 658.

As best illustrated in FIG. 11A, the cleaning solution distributor 650 is positioned within discharge nozzle 65, by any suitable means, such that lateral edge 660 is suspended equally between and upstream of upper lip 662 and lower lip 663 of nozzle 65 whereby exhaust air from fan 620, indicated by arrow 665, exiting through nozzle 65 is divided into two flows, an upper airflow, indicated by arrow 664 and flowing over top of fluid distributor 650, and lower airflow indicated by arrow 666 flowing below fluid distributor 650. As airstreams 664 and 666 approach the discharge nozzle lips 662 and 663, they are convergingly directed toward one another by sloped surfaces 668 and 670, respectively, thereby converging immediately downstream of the distributor's lateral edge 660. Liquid cleaning solution flows, by gravity, from supply tank 40 to manifold 656, via hose 328, through ducts 658 and into the turbulent airflow created by the converging airflows 664 and 666 exiting discharge nozzle 65° Flow dams 675, integrally molded onto top plate 648 and extending downstream from the lateral edge 660 thereof may be used to assist in positioning distributor 650 within discharge nozzle 65 if desired. However, it is preferred that a gap exist between flow dams 675 and the upper and lower lips 662, 663 of exhaust nozzle 65 to permit the flow of air therebetween as shown in figure 11B. Flow dams 675 are preferably positioned adjacent the exit orifice of each flow duct 658, as illustrated in FIG. 12, thereby serving as dams to prevent liquid cleaning solution, exiting ducts 658, from adhering to and flowing laterally along the distributor lateral edge 660.

The turbulent airflow exiting exhaust nozzle 65 exhibited a tendency to create an audible whistling noise on certain prototype models. It was discovered that, by the addition of strakes 682 and 684, the objectionable whistle is significantly reduced or eliminated. Strakes 682 and 684 are preferably molded as an integral part of lower lip 663, as illustrated in FIG. 11B, extending upwardly adjacent upper lid 662 and remaining external to the nozzle exit slot.

Referring now to FIGS. 2, 6, 8B, 16 and 17. The air turbine driven cleaning solution supply pump assembly 210 comprises an air driven turbine portion 211 (elements 214 through 220 in FIG. 16) and a centrifugal liquid cleaning solution supply pump portion 250 (elements 251 through 256 in FIG. 16) attached thereto and sharing a common rotating shaft 218. The air turbine half 211, of the turbine pump assembly 210, typically comprises two mating half housings 214 and 216. Exit housing 216 has integral therewith a center line discharge passageway 221 exiting housing 216 as an elbow discharge port 222 which fluidly communicates with elbow duct 680 (FIGS. 2 and 6). Axially centered within discharge passage 221 is bearing 220 rotatingly receiving therein shaft 218 having affixed thereto air turbine 217. When assembled, housings 214 and 216 encapsulate turbine 217 therebetween and cooperate to form an arcuate air inlet plenum 224 about a portion of the turbine periphery. Positioned within and integrally molded into inlet plenum 224 is a series of flow directing stator vanes 226 for directing incoming air into the turbine buckets 228 of turbine 217. A similar set of integrally molded air directing vanes 227 is provided with exit housing 216. The integrally molded air directing vanes in both housings 214 and 216 are configured such that the vanes of each housing axially extend between the vanes of the other as illustrated in FIG. 17. Further when housings 214 and 216 are assembled they cooperate to form inlet port 212. Integrally molded onto exit housing 216 is bracket 230 for attaching thereto a solution discharge valve 730. A detailed description of discharge valve 730 is provided below.

When the turbine portion 211 is assembled, shaft 218 extends axially through opening 232 as best illustrated in FIG. 17. The cleaning solution centrifugal pump 250 comprises pump housing 251 affixed to the air turbine end housing 214 by fasteners 252 as illustrated in FIG. 17. A full disc, self centering, elastomeric seal 256 is compressed against turbine end housing 214 by bead 257 circumscribing pump housing 251 thereby forming a water tight seal therebetween. Seal 256, at the axial center thereof includes an axially offset cylindrical nose portion 260 which axially protrudes through opening 232 of turbine end housing 214. Extending radially inward from nose 260 are two axially spaced sealing blades 262 and 264 sealingly engaging the outer periphery of the stepped down portion 219 of shaft 218 thereby fluidly sealing chamber 266 from air turbine 211. Circular plate 254 is forced against seal 256 by rim 255 of pump housing 251 having at the axial center thereof a flanged opening 268 through which the impeller end 270 of shaft 218 extends receiving thereon slotted impeller disc 252. Flanged opening 268 of plate 254 assists in radially positioning plate 254 about shaft 219.

Seal 256 incorporates a self centering feature especially useful during assembly of the turbine pump assembly. During assembly the turbine portion, elements 214 through 220, are assembled first. Seal 256 is then placed on shaft portion 219 and axially positioned such that nose portion 260 extends through opening 232 of end housing 214. Opening 232 is larger in diameter than the outside diameter of nose portion 260 providing an annular gap 234 about nose portion 260. Thus seal 256, when placed upon shaft 218, radially positions itself within opening 232. Bearing plate 254 similarly aligns itself radially upon placement of radial flange 268 inside nose portion 260 of seal 256 during assembly; annular gap 253 thereby provides radial movement of plate 254 about shaft 219.

In operation vacuum is applied to the air turbine discharge port 222 via elbow duct 680 which fluidly communicates with suction fan 620 thereby causing clean atmospheric air to enter turbine inlet port 212 passing through and thereby driving turbine 217. As turbine 217 rotates, pump impeller 252 is also rotated via shaft 218 thereby drawing cleaning solution into pump chamber 266 via supply tube 326 from reservoir 320 and discharging the fluid from the pump discharge port 272, under pressure, to solution discharge valve 730 via cross over tube 738.

Turning now to FIGS. 18 through 20, the cleaning solution discharge valve 730 comprises a main body 732 having a side inlet 734 and an upwardly directed outlet 736. Inlet 734 fluidly communicates with the discharge port 272 of pump 250 via cross over tube 738 whereby pressurized cleaning solution is supplied to the main body 732. Integral with and extending vertically from main body 732 is discharge port 740 configured as a nipple for receiving thereon the cleaning solution supply hose quick disconnect coupling 810 further described below. Axially aligned within discharge nipple 740 is axially translatable valve member 742 having a hollow core open at the top end 744 thereof and closed at the bottom 746 and having at least one side opening 748. Compression spring 750 acting upon circumferential flange 752 of valve member 742 biases valve member 742 toward the normally closed configuration as illustrated in FIG. 20 thereby sealingly compressing O-ring 754 between the main body 732 and flange 752.

Removably attachable to discharge nipple 740 is quick disconnect coupling 810. Coupling 810 comprises a main cylindrical body 812 having at least two, preferably four, equally spaced axially extending fingers 814 hingedly attached to the peripheral rim 816 of the cylindrical main body 812. Fingers 814 are configured to have an increasing thickness diverging from peripheral rim 816 to the end thereof. Closing off the opposite end of main body 812 is an axially extending tubular 818 to which upholstery nozzle supply hose 820 is attached. Tubulet 818 extends axially inside main body 812 providing a valve stem actuator 822 which when the main body 812 receives nipple 740 therein, axially aligns with valve stem 742 as illustrated. Circumscribing main body 812 of coupling 810 is a conically shaped locking collar 815 having an inwardly directed flange 822 circumscribing fingers 814.

When the main body 812 of coupling 810 is advanced downward over discharge nipple 740, as illustrated in FIG. 19, the valve member actuator 822 penetrates the nipple bore 760 forcing valve member 742 downward, compressing spring 750 to the extent that opening 748 of valve member 742 enters the main body chamber 731 of valve 730, thereby providing a fluid path through the valve member and tubular 818 into supply hose 820 and on to upholstery nozzle 550. O-ring 754 sealingly engages nipple 740 and the main body 812 of coupling 810 as illustrated in the figures.

Coupling 810 is lockingly secured to discharge nipple 740 by advancing collar 815 downward over fingers 814, as illustrated in FIG. 18, thereby forcing the inside surface of fingers 814 into contact with the outside conical surface of nipple 740 thereby preventing removal of the coupling 810 from discharge nipple 740.

Fingers 814 of the coupling main body 812 are provided with detents 813 receiving therein flange 822 of collar 815, as illustrated in FIG. 18, thereby locking collar 815 and coupling 810 in the coupled configuration.

To remove coupling 810, collar 815 is axially withdrawn to the release position thereby releasing fingers 814 from nipple 740, as illustrated in FIG. 19, and axially removing coupling 810 from nipple 740. As is readily appreciated valve member 742 returns to its closed configuration, FIG. 20, as coupling 810 is removed by action of compression spring 750.

Referring now to FIGS. 2, 7, 8B, 15 and 24. The air turbine driven cleaning solution pump 210 is affixed to base frame 616, under hood 710 such that discharge exit 222, of the air turbine side of the assembly, aligns with and fluidly communicates with elbow duct 680 which fluidly communicates with the suction fan inlet plenum 619.

Hood 710 of nozzle assembly 70 overlies turbine pump 210 whereby the turbine air inlet 212 and the cleaning solution discharge nipple 740 of the attached solution discharge valve 730 are positioned within opening 765 in hood 710 thereby providing easy access to discharge valve 730 for attachment of the upholstery cleaning supply hose quick disconnect coupling 810 thereto. Trap door valve 766 is hingedly attached to opening 765 closing opening 765 when not in use. Valve door 766 is fitted, on the bottom side thereof, with a rectangular elastomeric seal 768 configured to engage and sealingly close inlet port 212 of air turbine 210 when door 766 is in the closed (floor cleaning mode) position.

Thus when extractor 10 is used in the floor cleaning mode, the air inlet port to air turbine 212 is sealed from the atmosphere by trap door valve 766 thereby preventing operation of the turbine pump assembly 210. However, when converted to the upholstery and/or stair cleaning mode, valve door 766 is opened, thereby opening turbine inlet port 212 to the atmosphere allowing air to flow through the air turbine 211 to the suction fan inlet plenum 619 thereby powering cleaning solution pump 250 and providing pressurized cleaning solution to upholstery nozzle 550 via supply tube 820 when coupling 810 is attached to discharge value 730.

Figures 23, 24:
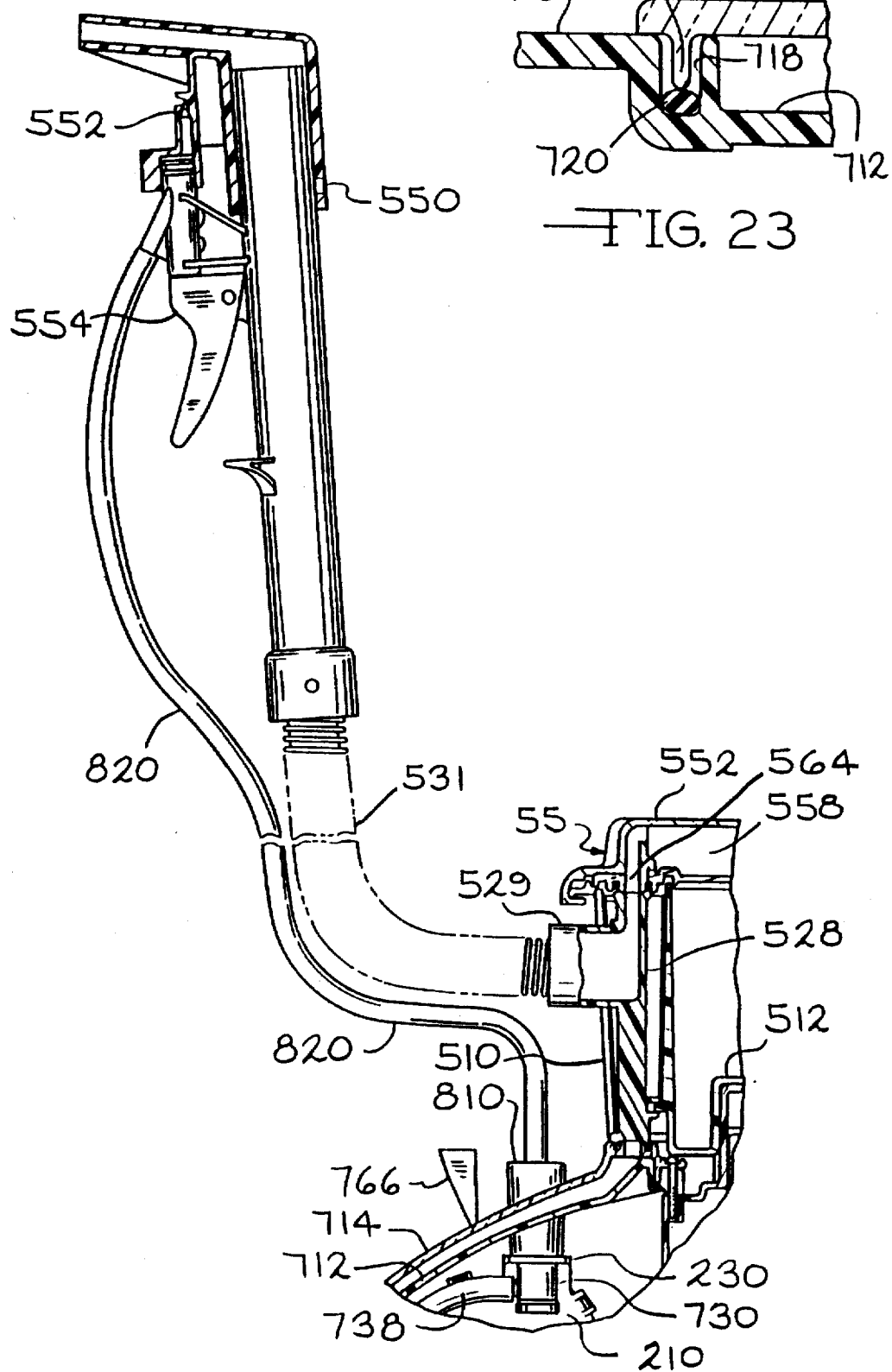
FIG. 23 is a cross-sectional view taken along line 23—23 of FIG. 2.
FIG. 24 is a partial sectional view, similar to FIG. 8B, showing the upright extractor converted to the above floor cleaning mode.
Figure 25:
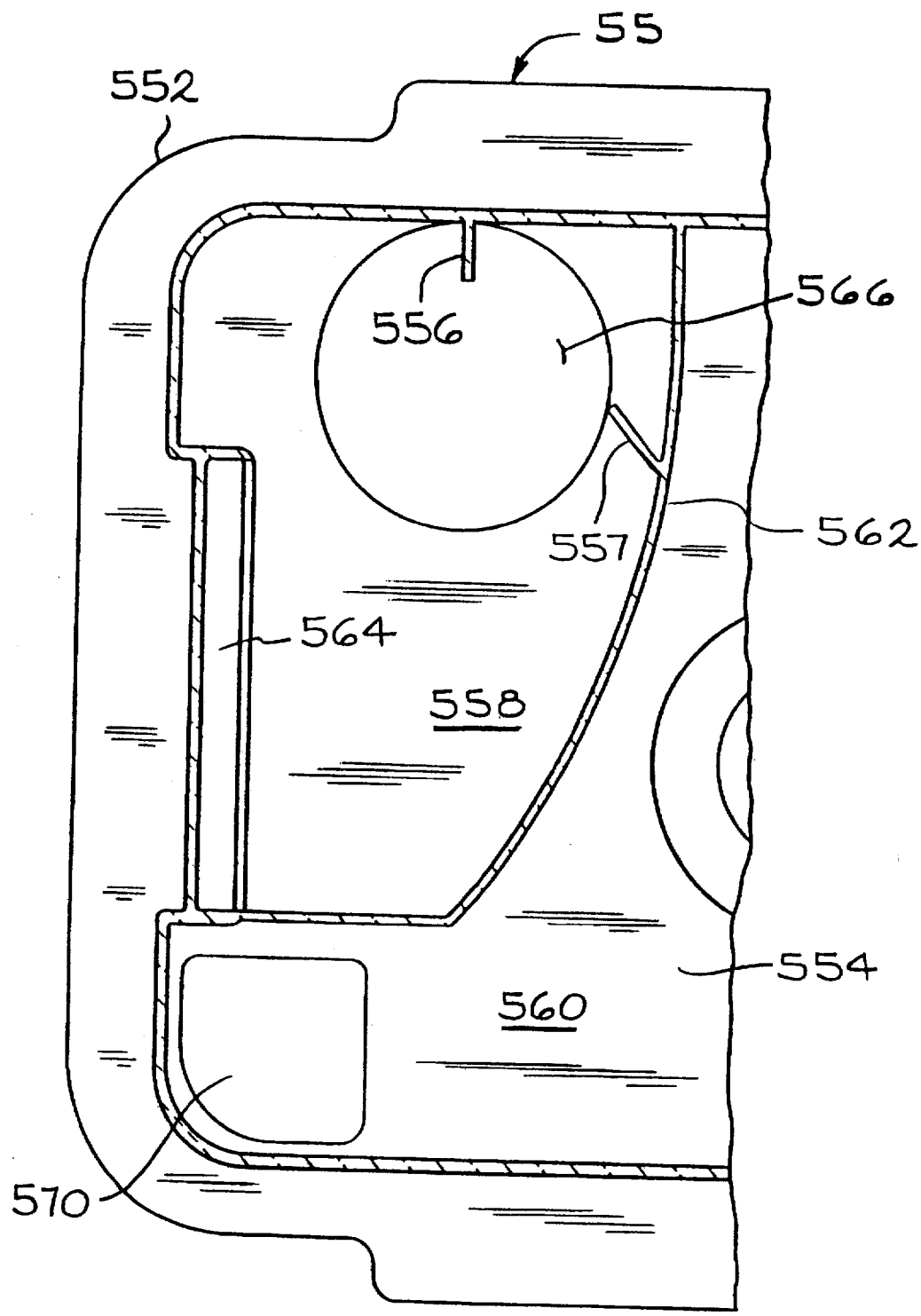
FIG. 25 is a cross-sectional view taken along line 25—25 in FIG. 8B.

Referring now to FIGS. 5, 8B and 24. The upright extractor 10 may be conveniently converted from the floor cleaning mode, as illustrated in FIG. 8B, to the above floor cleaning mode, as illustrated in FIG. 24. To affect the conversion, the operator removes the air/liquid separator lid assembly 55 from recovery tank 510 and withdraws floor module 526 from slot 530 in the forward wall of tank 510 and inserts the above floor module 528 having suction hose 531 fluidly attached to inlet port 529 thereof.

As best seen in FIG. 24, module 528 fluidly communicates with suction hose 531 thereby by passing floor nozzle 716. Fluidly attached to suction hose 531 is a typical hand operated upholstery/stair cleaning nozzle 550 having typical spray means 552 for dispensing cleaning solution upon the surface being cleaned. A typical on-off trigger operated valve 554 is provided to control the amount of solution dispensed. Pressurized cleaning solution is supplied to valve 554 via supply tube 820 connected to the turbine driven solution supply pump discharge valve 730 by quick disconnect coupling 810. Solution supply pump 210 typically supplies the cleaning solution at a pressure of at least 4 psia and preferably 6 psia.

In operation, the inlet plenum 619 of motor fan 610 fluidly communicates with recovery tank 50 via stand pipe 672 and 572 thereby creating a vacuum within tank 50. When extractor 10 is operated in the floor cleaning mode working air, including entrained fluid, is drawn into floor nozzle 70, through floor conversion module 526, air/fluid separator lid 55 and into the recovery tank 510. Warm, moist exhaust air, from motor fan 610, is discharged through discharge nozzle 65 and directed toward the surface being cleaned. Cleaning solution, upon the operator's command, is discharged from the cleaning fluid supply tank 40, passing through discharge valve 350, supply line 328, and into the fluid distributor 650 positioned within air discharge nozzle 65 whereby the cleaning fluid is atomizingly distributed throughout the discharged air and conveyed thereby to the surface being cleaned.

When extractor 10 is operated in the upholstery and/or stair cleaning mode, upholstery conversion adapter 528 replaces the floor cleaning adapter 526 thereby by passing floor nozzle 70 and fluidly connecting the intake port 564 of the air/water separator lid 55 with flexible hose 531. Thus working air, including entrained liquid, is drawn through upholstery nozzle 550, and into the air/water separator lid 55. Exhaust air, from motor fan 610, continues to be discharged from exhaust nozzle 65, however, solution supply valve 350 is closed thereby preventing the flow of cleaning fluid to fluid distributor 650.

In the upholstery cleaning mode, cleaning solution is supplied, under pressure, to upholstery nozzle 550 by the air turbine driven solution pump 250, the motive power driving pump 250 being supplied by air turbine 211. The suction port 222 of air turbine 211 fluidly communicates, via elbow duct 680, with the inlet plenum 619 of motor fan 610 while the intake port of the air turbine is open to the atmosphere via trap door valve 766. Valve door 766 is normally closed (carpet cleaning mode) thereby preventing the flow of atmospheric air thereto, thereby rendering turbine 211 inoperative. However, in the upholstery/stair cleaning mode valve door 766 is opened thereby activating turbine 211 (and solution pump 250) by permitting the flow of clean atmospheric air through the turbine to power pump 250. Thus, when in the upholstery/stair cleaning mode a steady pressurized flow of cleaning solution is supplied to upholstery nozzle 550. It is preferred that air turbine 211 and solution pump 250 be engineered to provide a cleaning solution flow rate of 0.10 gallons per minute at a pressure of between four to ten pounds psia.

Although the present invention has been described in connection with a preferred embodiment thereof, many variations and modifications will become apparent to those skilled in the art. It is preferred, therefore, that the present invention be limited not by the specific disclosure herein, but only by the following appended claims.

I claim:

1. A quick disconnect fluid coupling comprising:
   a) a hollow main body member having an inlet and an outlet, said outlet comprising an elongate nipple extending from said body, the outside diameter of said nipple at its distal end being larger than the diameter at its proximal end, defining a converging outside wall, b) a removable sleeve member having a cylindrical cavity receiving therein at least a portion of said nipple distal end, c) sealing means between said nipple and said sleeve cavity providing a liquid tight seal therebetween, d) a plurality of axial fingers hingedly extending from said sleeve, said fingers juxtaposed the outer surface of said nipple, said fingers having an increasing thickness from said sleeve member to the end thereof, e) means for urging said fingers radially inward against the converging outside wall of said nipple thereby preventing removal of said sleeve from said nipple.

2. The coupling as claimed in claim 1 wherein said main body member further includes outlet valve means normally biased to the closed position, and said removable sleeve member includes means for opening said outlet valve means when said sleeve and said nipple are coupled together.

3. The coupling as claimed in claim 2 wherein said outlet valve means comprises a cylindrical valve stem slidingly received within said nipple, said valve stem having an open end adjacent said nipple distal end and a closed end extending into said main body cavity, said valve stem closed end having a radially extending flange circumscribing the outer periphery thereof thereby forming a seat for receiving thereon an O-ring seal, said valve stem further having an opening through the cylindrical wall thereof and positioned between said flange and said open end, means for biasing said valve stem to its closed position whereby said O-ring is sealingly compressed between said radial flange and said main body thereby preventing fluid flow from said main body to said outlet nipple, valve opening means on said sleeve for depressing said valve stem into said main body whereby said wall opening enters said main body thereby permitting fluid flow from said main body, through said valve stem.

4. The coupling as claimed in claim 3 wherein said valve opening means comprises a coaxially extending tubelet inside said removable sleeve member whereby said tubelet is caused to enter said main body outlet nipple and displace said valve stem into said main body as said nipple enters said sleeve.

* * * * *